US009177508B2

(12) United States Patent
Kikuchi et al.

(10) Patent No.: US 9,177,508 B2
(45) Date of Patent: Nov. 3, 2015

(54) LIGHT EMITTING APPARATUS

(71) Applicant: ROHM CO., LTD., Ukyo-Ku, Kyoto (JP)

(72) Inventors: Hiroki Kikuchi, Kyoto (JP); Masao Yonemaru, Kyoto (JP)

(73) Assignee: ROHM CO., LTD. (JP)

( * ) Notice: Subject to any disclaimer, the term of this patent is extended or adjusted under 35 U.S.C. 154(b) by 66 days.

(21) Appl. No.: 14/034,967

(22) Filed: Sep. 24, 2013

(65) Prior Publication Data

US 2014/0168567 A1    Jun. 19, 2014

Related U.S. Application Data

(63) Continuation of application No. PCT/JP2012/001874, filed on Mar. 16, 2012.

(30) Foreign Application Priority Data

Mar. 24, 2011  (JP) ................ 2011-066267
Mar. 24, 2011  (JP) ................ 2011-066268
Mar. 25, 2011  (JP) ................ 2011-068843

(51) Int. Cl.
*H05B 37/02*    (2006.01)
*G09G 3/34*    (2006.01)
(Continued)

(52) U.S. Cl.
CPC .......... *G09G 3/3406* (2013.01); *H05B 33/0815* (2013.01); *H05B 33/0848* (2013.01); *H02M 3/33507* (2013.01)

(58) Field of Classification Search
CPC .................................... H05B 33/00
USPC .............. 315/291, 307, 312, 246, 247, 224
See application file for complete search history.

(56) References Cited

U.S. PATENT DOCUMENTS

2010/0320921 A1* 12/2010 Kim et al. ............. 315/210
2010/0327758 A1* 12/2010 Chung et al. ......... 315/186
(Continued)

FOREIGN PATENT DOCUMENTS

JP         05196677 A    8/1993
JP     2006-114324 A    4/2006
(Continued)

OTHER PUBLICATIONS

International Preliminary Report on Patentability for International Application No. PCT/JP2012/001874; Date of Issuance: Sep. 24, 2013; with English Translation.
(Continued)

*Primary Examiner* — Minh D A
(74) *Attorney, Agent, or Firm* — Cantor Colburn LLP

(57) ABSTRACT

A current driving circuit is connected to an LED terminal $LED_i$, and generates an intermittent driving current $I_{LEDi}$ that corresponds to a dimming pulse signal $PWM_i$. An error amplifier generates a feedback voltage $V_{FB}$ that corresponds to the difference between a detection voltage $V_{LEDi}$ and a predetermined reference voltage $V_{REF}$. A pulse modulator generates a pulse signal having a duty ratio that corresponds to the feedback voltage $V_{FB}$. A fault detection comparator $COMP\_OPEN_i$ generates a fault detection signal $OPEN\_DET$ which is asserted when the detection voltage $V_{LEDi}$ is lower than a predetermined threshold voltage $V_{OPEN\_DET}$. A forced turn-off circuit instructs the current driving circuit to suspend the generation of the driving current $I_{LEDi}$ during a predetermined period after a switching power supply starts to operate. The fault detection circuit detects whether or not the fault detection signal $OPEN\_DET_i$ has been asserted in a predetermined period.

34 Claims, 8 Drawing Sheets

(51) Int. Cl.
  *H05B 33/08* (2006.01)
  *H02M 3/335* (2006.01)

(56) References Cited

U.S. PATENT DOCUMENTS

| | | | | |
|---|---|---|---|---|
| 2010/0327772 A1* | 12/2010 | Lee et al. | ...................... | 315/297 |
| 2011/0001433 A1* | 1/2011 | Lee et al. | .................. | 315/185 R |
| 2011/0068700 A1* | 3/2011 | Fan | ........................... | 315/185 R |

FOREIGN PATENT DOCUMENTS

| JP | 2006-339298 A | 12/2006 |
|---|---|---|
| JP | 2007-158083 A | 6/2007 |
| JP | 2008-064477 A | 3/2008 |
| JP | 2008186668 A | 8/2008 |
| JP | 2008-258428 A | 10/2008 |
| JP | 2008-300208 A | 12/2008 |
| JP | 2010-118245 A | 5/2010 |
| JP | 2011-023750 A | 2/2011 |

OTHER PUBLICATIONS

International Search Report for International Application No. PCT/JP2012/001874; Date of Mailing: Jun. 19, 2012, with English Translation.

Japanese Notification of Reason(s) for Refusal corresponding to Patent Application No. 2011-068843; Dispatch Date, Dec. 24, 2014; with English translation.

Japanese Notification of Reason(s) for Refusal corresponding to Patent Application No. 2011-066267; Dispatch Date: Nov. 18, 2014, with English translation.

* cited by examiner

LIGHT EMITTING APPARATUS

BACKGROUND OF THE INVENTION

1. Field of the Invention

The present invention relates to a light-emitting apparatus.

2. Description of the Related Art

In recent years, as a backlight of a liquid crystal panel or as an illumination device, a light-emitting apparatus is employed which uses a light-emitting element such as an LED (light-emitting diode) or the like. Related techniques are disclosed in Japanese Patent Application Laid Open No. 2006-114324, Japanese Patent Application Laid Open No. 2008-300208, Japanese Patent Application Laid Open No. 2006-339298, Japanese Patent Application Laid Open No. 2008-064477, Japanese Patent Application Laid Open No. 2008-258428, and Japanese Patent Application Laid Open No. 2007-158083. FIG. 1 is a circuit diagram showing an example configuration of a light-emitting apparatus investigated by the present inventor. It should be noted that the present applicant has recognized that the configuration and operation of a light-emitting apparatus 1003 described below is outside the scope of conventional techniques. The light-emitting apparatus 1003 includes multiple (n-channel) LED strings 6_1 through 6_n, a switching power supply 1004, and a current driving circuit 1008.

Each LED string 6 includes multiple LEDs connected in series. The switching power supply 1004 is configured to step up an input voltage $V_{IN}$, and to supply a driving voltage $V_{OUT}$ thus stepped up to an anode-side end of each of the multiple LED strings 6_1 through 6_n.

The current driving circuit 1008 is configured to adjust the luminance level of the LED strings 6 using a combination of an analog diming control method and a burst dimming control method (which will also be referred to as the "PWM dimming control method"). A current source $CS_i$ ($1 \leq i \leq n$) is connected to a cathode-side end of the corresponding LED string 6_i, and is configured to supply a driving current $I_{LED}$ to the LED string 6_i according to the target luminance level. The dimming control method in which the luminance level is adjusted according to the magnitude of the driving current $I_{LED}$ is referred to as the "analog dimming control method".

A PWM controller 1009 is configured to generate dimming pulse signals $PWM_1$ through $PWM_n$ having a duty ratio that corresponds to the target luminance level, so as to intermittently turn on the current sources $CS_1$ through $CS_n$ with a duty ratio that corresponds to the dimming pulse signal PWM. With such an arrangement, the driving current $I_{LED}$ flows through the LED strings 6 only during the on-period (on time) $T_{ON}$. Such an arrangement controls the time average of the driving current $I_{LED}$, thereby adjusting the luminance level.

The switching power supply 1004 includes an output circuit 1102 and a control IC 1100. The output circuit 1102 includes an inductor L1, a switching transistor M1, a rectifier diode D1, and an output capacitor C1. The control IC 1100 is configured to control the on/off duty ratio of the switching transistor M1 so as to adjust the driving voltage $V_{OUT}$.

The control IC 1100 is configured to stabilize the driving voltage $V_{OUT}$ such that the voltage between both terminals of the current source CS, i.e., the voltage $V_{LED}$ (which will be referred to as the "detection voltage") that develops at a cathode-side end of the LED string 6, matches a predetermined reference voltage $V_{REF}$.

An error amplifier 22 is configured to amplify the difference between the reference voltage $V_{REF}$ and the lowest from among the multiple channels of detection voltages $V_{LED1}$ through $V_{LEDn}$ (which will simply be referred to as the "detection voltage $V_{LED}$"), so as to generate a feedback voltage $V_{FB}$. The error amplifier 22 includes a transconductance amplifier (gm amplifier) 21, a feedback switch SW1, a phase compensation resistor $R_{FB}$, and a capacitor $C_{FB}$. The feedback switch SW1 is turned on when the dimming pulse signal PWM indicates the turning-on time. The gm amplifier 21 is configured to generate a current that corresponds to the difference between the detection voltage $V_{LED}$ and the reference voltage $V_{REF}$. The capacitor $C_{FB}$ is charged and discharged using the current thus generated, thereby generating the feedback voltage $V_{FB}$ at the feedback (FB) terminal.

A pulse modulator 20 is configured to generate a pulse signal $S_{PWM}$ having a duty ratio that corresponds to the feedback voltage $V_{FB}$. A driver 28 is configured to drive a switching transistor M1 according to the pulse signal $S_{PWM}$. In the burst dimming control operation, the driver 28 is configured to perform switching of the switching transistor M1 only during the on-period $T_{ON}$, and to suspend the switching of the switching transistor M1 during the off-period $T_{OFF}$.

Problem 1

With such a control IC 1100, there is a need to detect an open fault, a ground fault, and the like, for each of the LED strings 6_1 through 6_n. Furthermore, there is a need to perform a suitable control operation or suitable protection according to the state thus detected. In order to detect the state of each of the LED strings 6_1 through 6_n, a method is conceivable in which the detection voltages $V_{LED1}$ through $V_{LEDn}$ detected at the respective LED terminals $LED_1$ through $LED_n$ are each compared with a predetermined threshold voltage.

Description will be made directing attention to the i-th channel. In a case in which the LED string 6_i is connected normally to this channel of the LED terminal $LED_i$, the detection voltage $V_{LEDi}$ detected at the LED terminal $LED_i$ matches the reference voltage $V_{REF}$ in the on-period $T_{ON}$ of the LED string 6_i. That is to say, the detection voltage $V_{LEDi}$ is higher than the threshold voltage.

In contrast, if an open fault occurs in the LED string 6_i, the detection voltage $V_{LEDi}$ falls to the vicinity of the ground voltage. Also, if the LED terminal $LED_i$ is short-circuited to the ground terminal (if a ground fault occurs), the detection voltage $V_{LEDi}$ falls to the vicinity of the ground voltage. Also, when the user disables the i-th channel, the LED string 6_i is not connected to the LED terminal $LED_i$, and the detection voltage $V_{LEDi}$ also falls to the vicinity of the ground voltage, in the same manner as when an open fault occurs.

That is to say, with such a simple method in which the detection voltage $V_{LEDi}$ of the LED terminal LED is compared with a threshold voltage, such an arrangement cannot distinguish between an open state in which the LED string 6_i is not connected, an open fault that occurs in the LED string 6_i, and a short-circuit fault that occurs in the LED terminal.

It should be noted that the above-described problem is by no means within the scope of common and general knowledge in the field of the present invention. Furthermore, it can be said that the present applicant has been the first to arrive at this problem.

Problem 2

Description will be made regarding the start-up operation of the light-emitting apparatus 1003 shown in FIG. 1.

When a standby signal STB is low level, the control IC 1100 is in the shutdown state. In this state, the output voltage $V_{OUT}$ is 0 V. Furthermore, immediately after the start-up operation, the feedback voltage $V_{FB}$ is also zero.

When the standby signal STB is switched to high level, the control IC 100 is restored from the shutdown state, which starts the boosting operation of the switching power supply 1004.

In the burst dimming operation, the switching transistor M1 is configured to perform the switching operation only during the on-period $T_{ON}$. Accordingly, in a case in which the dimming pulse signal PWM has a small duty ratio, because this reduces the period of time in which the output capacitor C1 is charged, this leads to a reduction in the boosting rate of the output voltage $V_{OUT}$, thus lengthening the period of time for the startup operation.

In addition, immediately after the startup operation, the detection voltage $V_{LED}$ is lower than the reference voltage $V_{REF}$. In this state, the gm amplifier 21 outputs a current so as to charge the capacitor $C_{FB}$. Thus, a feedback operation is performed so as to raise the feedback voltage $V_{FB}$. However, the output current of the gm amplifier 21 is supplied to the capacitor $C_{FB}$ only during the on-period $T_{ON}$ indicated by the dimming control pulse signal PWM. Thus, in a case in which the dimming pulse signal PWM has a small duty ratio, this reduces the period of time in which the capacitor $C_{FB}$ is charged. This leads to a reduction in the rising rate of the feedback voltage $V_{FB}$, i.e., a reduction in the rising rate of the duty ratio of the PWM signal S. As a result, the period of time for the startup operation lengthens, which is a problem.

It should be noted that the above-described problem is by no means within the scope of common and general knowledge in the field of the present invention. Furthermore, it can be said that the present applicant has been the first to arrive at this problem.

SUMMARY OF THE INVENTION

Several embodiments of the present invention have been made in order to solve the aforementioned problem 1. Accordingly, it is an exemplary purpose of an embodiment of the present invention to provide a control circuit which is capable of detecting and distinguishing between various kinds of states of a light-emitting element.

1. An embodiment of the present invention relates to a control circuit configured to control a switching power supply for supplying a driving voltage to a first terminal of a light-emitting element, and to generate a driving current that flows through the light-emitting element. The control circuit is configured to control a switching power supply for supplying a driving voltage to a first terminal of a light-emitting element, and to generate a driving current that flows through the light-emitting element. The control circuit comprises: a connection terminal to be connected to a second terminal of the light-emitting element; a current driving circuit connected to the connection terminal, and configured to generate an intermittent driving current that corresponds to a dimming pulse signal; an error amplifier configured to generate a feedback voltage that corresponds to a difference between a detection voltage that occurs at the connection terminal and a predetermined reference voltage; a pulse modulator configured to generate a pulse signal having a duty ratio that corresponds to the feedback voltage; a driver configured to drive a switching element of the switching power supply according to the pulse signal; a fault detection comparator configured to generate a fault detection signal which is asserted when the detection voltage is lower than a predetermined threshold voltage; a forced turn-off circuit configured to instruct the current driving circuit to suspend the generation of the driving current during a predetermined period after the switching power supply starts to operate; and a fault detection circuit configured to detect whether or not the fault detection signal is asserted in the predetermined period.

With such an embodiment, in a predetermined period in which the supply of the driving current is suspended immediately after the switching power supply is started up, in a case in which a light-emitting element has not been connected to the connection terminal from the first in the startup operation, or otherwise if the connection terminal is short-circuited to the ground, the detection voltage becomes lower than the threshold voltage. On the other hand, in a case in which the light-emitting element is connected normally to the connection terminal in this period, the detection voltage becomes higher than the threshold voltage. Such an embodiment is capable of detecting a state in which the light-emitting element has not been connected to the connection terminal from the first in the startup operation, and a state in which the connection terminal is short-circuited to the ground from the first in the startup operation. Thus, such an arrangement is capable of performing a protection operation or otherwise a specified control operation according to the detection result.

Also, the forced turn-off circuit may be configured to instruct the current driving circuit to suspend the generation of the driving current during the predetermined period after the driving current that flows through the light-emitting element reaches a predetermined level.

Also, the forced turn-off circuit may be configured to instruct the current driving circuit to suspend the generation of the driving current during the predetermined period after a soft start voltage, which rises with time, reaches a predetermined level.

Also, the control circuit according to an embodiment may further comprise a pull-up circuit configured to be switchable between an active state and an inactive state, and to supply a current to the connection terminal when is set to the active state. Also, the fault detection circuit may be further configured to set the pull-up circuit to the active state when the fault detection signal is asserted in the predetermined period, and to detect whether or not the fault detection signal is asserted after the pull-up circuit is set to the active state.

With such an arrangement, in a case in which the light-emitting element has not been connected to the connection terminal, the detection voltage is pulled up to high level. Thus, in this case, the detection voltage becomes higher than the threshold voltage, which negates the fault detection signal. Conversely, in a case in which the connection terminal is short-circuited to the ground, the detection voltage remains low level. In this case, the detection voltage is lower than the threshold voltage, which asserts the fault detection signal. That is to say, such an embodiment is capable of performing a fault detection operation in the startup operation so as to distinguish between a state in which the light-emitting element has not been connected to the connection terminal and a state in which a ground fault has occurred. Thus, such an arrangement is capable of performing a protection operation or otherwise a specified control operation according to the detection result.

Also, the fault detection circuit may be further configured such that, when the fault detection signal is not asserted in the predetermined period, the fault detection circuit detects whether or not the fault detection signal is asserted in a period in which the current driving circuit generates the driving current.

After the startup operation, in a case in which the light-emitting element has disconnected from the connection terminal (open fault) or in a case in which the connection terminal is short-circuited to the ground, the fault detection signal is asserted. That is to say, such an embodiment is capable of detecting a fault that occurs after the startup operation.

2. Another embodiment of the present invention relates to a control circuit configured to control a switching power supply for supplying a driving voltage to a first terminal of a light-emitting element, and to generate a driving current that flows through the light-emitting element. The control circuit is configured to control a switching power supply for supplying a driving voltage to a first terminal of a light-emitting element, and to generate a driving current that flows through the light-emitting element. The control circuit comprises: a connection terminal to be connected to a second terminal of the light-emitting element; a current driving circuit connected to the connection terminal, and configured to generate an intermittent driving current that corresponds to a dimming pulse signal; an error amplifier configured to generate a feedback voltage that corresponds to a difference between a detection voltage that occurs at the connection terminal and a predetermined reference voltage; a pulse modulator configured to generate a pulse signal having a duty ratio that corresponds to the feedback voltage; a driver configured to drive a switching element of the switching power supply according to the pulse signal; a fault detection comparator configured to generate a fault detection signal which is asserted when the detection voltage is lower than a predetermined threshold voltage; a pull-up circuit configured to be switchable between an active state and an inactive state, and to supply a current to the connection terminal when it is set to the active state; and a fault detection circuit configured to set the pull-up circuit to the active state when the fault detection signal is asserted, and to detect whether or not the fault detection signal is asserted after the pull-up circuit is set to the active state.

With such an embodiment, in a case in which the light-emitting element has not been connected to the connection terminal, the detection voltage is pulled up to high level by means of the pull-up circuit. Thus, in this case, the detection voltage becomes higher than the threshold voltage, which negates the fault detection signal. Conversely, in a case in which the connection terminal is short-circuited to the ground, the detection voltage remains low level. In this case, the detection voltage is lower than the threshold voltage, which asserts the fault detection signal. That is to say, such an embodiment is capable of performing a fault detection operation in the startup operation so as to distinguish between a state in which the light-emitting element has not been connected to the connection terminal and a state in which a ground fault has occurred. Thus, such an arrangement is capable of performing a protection operation or otherwise a specified control operation according to the detection result.

Also, the control circuit according to an embodiment may further comprise a forced turn-off circuit configured to instruct the current driving circuit to suspend the generation of the driving current during a predetermined period after the switching power supply starts to operate. Also, the fault detection circuit may be configured to set the pull-up circuit to the active state when the fault detection signal is asserted in the predetermined period, and to detect whether or not the fault detection signal is asserted after the pull-up circuit is set to the active state.

With such an embodiment, in a predetermined period in which the supply of the driving current is suspended immediately after the switching power supply is started up, in a case in which a light-emitting element has not been connected to the connection terminal from the first in the startup operation, or otherwise if the connection terminal is short-circuited to the ground, the detection voltage becomes lower than the threshold voltage. On the other hand, in a case in which the light-emitting element is connected normally to the connection terminal in this period, the detection voltage becomes higher than the threshold voltage. Such an embodiment is capable of detecting a state in which the light-emitting element has not been connected to the connection terminal from the first in the startup operation, and a state in which the connection terminal is short-circuited to the ground from the first in the startup operation. Thus, such an arrangement is capable of performing a protection operation or otherwise a specified control operation according to the detection result.

Also, the forced turn-off circuit may be configured to instruct the current driving circuit to suspend the generation of the driving current during the predetermined period after the driving current that flows through the light-emitting element reaches a predetermined level.

Also, the forced turn-off circuit may be configured to instruct the current driving circuit to suspend the generation of the driving current during the predetermined period after a soft start voltage, which rises with time, reaches a predetermined level.

Also, when the fault detection signal is asserted in a period in which the current driving circuit generates the driving current, the fault detection circuit may be configured to set the pull-up circuit to the active state. Also, after the pull-up circuit is set to the active state, the fault detection circuit may be configured to detect whether or not the fault detection signal has been asserted.

After the startup operation, in a case in which the light-emitting element has disconnected from the connection terminal (open fault) or in a case in which the connection terminal is short-circuited to the ground, the fault detection signal is asserted. That is to say, such an embodiment is capable of detecting a fault that occurs after the startup operation.

Also, several embodiments of the present invention have been made in order to solve the aforementioned problem 2. Accordingly, it is an exemplary purpose of an embodiment of the present invention to provide a control circuit for a switching power supply which allows the switching power supply to start up in a short period of time even if the dimming pulse signal has a small duty ratio.

3. Yet another embodiment of the present invention relates to a control circuit configured to control a switching power supply for supplying a driving voltage to a first terminal of a light-emitting element, and to generate a driving current that flows through the light-emitting element. The control circuit comprises: a current driving circuit connected to a second terminal of the light-emitting element, and configured to supply the light-emitting element with an intermittent driving current that corresponds to a dimming pulse signal; a transconductance amplifier configured to generate a current that corresponds to a difference between a predetermined reference voltage and a detection voltage that occurs between the terminals of the current driving circuit; a feedback terminal to be connected to a feedback capacitor; a feedback switch arranged between the feedback terminal and an output terminal of the transconductance amplifier, and configured to turn on according to the dimming pulse signal; a soft start circuit configured to generate a soft start voltage which changes with time; a clamp circuit configured to be set to an active state so as to control a feedback voltage that develops at the feedback terminal such that it becomes equal to the soft start voltage regardless of the detection voltage level during a predetermined period after the switching power supply starts to operate; a pulse modulator configured to generate a pulse signal having a duty ratio that corresponds to the feedback voltage; and a driver configured to drive a switching element of the switching power supply according to the pulse signal during a period in which the dimming pulse signal indicates a turn-on instruction, and to turn off the switching element during a period in which the dimming pulse signal indicates a turn-off instruction.

Such an embodiment is capable of raising the feedback voltage according to the soft start voltage even if the dimming pulse signal has a small duty ratio. Thus, such an arrangement requires only a short period of time to raise the output voltage. Furthermore, with such an embodiment, after a predetermined period elapses after the startup operation of the switching power supply, the clamp circuit is set to the inactive state, which disables the feedback voltage control operation in which the feedback voltage is controlled according to the soft start voltage, thereby switching the feedback control operation such that the detection voltage approaches the reference voltage.

Also, the feedback switch may be turned on during a period in which the clamp circuit is in an inactive state and the dimming pulse signal indicates a turn-on instruction.

Also, the clamp circuit may comprise: a first transistor having a first electrode connected to the feedback terminal; and a second transistor having a first electrode connected to a control electrode of the first transistor, and having a control electrode supplied with the soft start voltage, and configured as a transistor that is complementary to the first transistor.

The first terminal may be configured as a source of a field-effect transistor (FET), or otherwise as an emitter of a bipolar transistor. The second terminal may be configured as a drain of an FET, or otherwise as a collector of a bipolar transistor. The control terminal may be configured as a gate of an FET or otherwise as a base of a bipolar transistor.

Also, the clamp circuit may further comprise an off circuit configured to fix a voltage at the control electrode of the first transistor to a level which turns off the first transistor during a period in which the clamp circuit is in the inactive state.

Also, the clamp circuit may further comprise an impedance circuit arranged between the feedback terminal and a fixed voltage terminal, and configured to turn on during a period in which the clamp circuit is in the active state.

Also, the clamp circuit may be set to the active state during a period until the driving current that flows through the light-emitting element reaches a predetermined level after the switching power supply starts up.

Such an arrangement is capable of switching to the normal feedback control operation after the driving current having a predetermined level starts to flow through the light-emitting element.

Also, the current driving circuit may comprise: a driving transistor and a current detection resistor arranged between the second terminal of the light-emitting element and a fixed voltage terminal; and an operational amplifier having an inverting input terminal connected to a connection node that connects the driving transistor and the current detection resistor, and having a non-inverting terminal to which a control voltage indicating the driving current is applied. Also, the control circuit may further comprise an on-state detection circuit configured to compare a voltage at the control electrode of the driving transistor with a predetermined voltage level in a period in which the dimming pulse signal indicates a turn-on instruction, so as to detect whether or not the driving current that flows through the light-emitting element reaches a predetermined level.

The voltage at the control electrode of the driving transistor falls as the driving current increases. Thus, by setting the threshold level to a suitable value, such an arrangement is capable of appropriately detecting whether or not the driving current has started to flow at the predetermined level.

Also, the current driving circuit may be arranged between the control electrode of the driving transistor and the fixed voltage terminal. Also, the current driving circuit may further comprise a dimming switch controlled to switch on and off according to the dimming pulse signal.

Also, the on-state detection circuit may comprise: a P-channel MOSFET having a source connected to a high voltage side power supply terminal of the operational amplifier, and having a gate connected to the control electrode of the driving transistor; a current source arranged between a drain of the P-channel MOSFET and a low voltage side power supply terminal of the operational amplifier; an N-channel MOSFET having a gate connected to the drain of the P-channel MOSFET, and having a source connected to the low voltage side power supply terminal; and a load arranged between a drain of the N-channel MOSFET and the high voltage side power supply terminal. Also, the on-state detection circuit may be configured to output, as a signal which indicates a detection result, a signal that corresponds to a drain voltage of the N-channel MOSFET that develops in a period in which the dimming pulse signal indicates a turn-on instruction.

When the voltage at the control electrode of the driving transistor falls, the gate-source voltage of the P-channel MOSFET increases. Thus, by monitoring the gate-source threshold voltage of the MOSFET, such an embodiment is capable of detecting whether or not the driving current has started to flow.

Also, the on-state detection circuit may further comprise a flip-flop having a data terminal supplied with a drain voltage of the N-channel MOSFET, and having a clock terminal supplied with a signal that corresponds to a logical AND of the dimming pulse signal and a synchronization clock signal. Also, the on-state detection circuit may be configured to output an output signal of the flip-flop as a signal which indicates a detection result.

Also, the clamp circuit may be configured to be set to the active state during a period in which a voltage that corresponds to the output voltage of the switching power supply is lower than a predetermined level after the switching power supply starts to operate.

Also, the clamp circuit may be configured to be set to the active state during a period in which the output voltage of the switching power supply is lower than a level which allows the light-emitting element to emit light.

Also, the clamp circuit may be configured to be set to the active state during a period in which the soft start voltage is lower than a predetermined threshold voltage.

Also, the pulse modulator may comprise: an oscillator configured to generate a cyclic voltage having a predetermined frequency and having a triangle waveform or a sawtooth waveform; and a pulse width modulation comparator configured to compare the feedback voltage with the cyclic voltage so as to generate a pulse signal.

Yet another embodiment of the present invention relates to a driving circuit for a light-emitting element. The driving circuit for a light-emitting element comprises: a current driving circuit connected to a second terminal of a light-emitting element, and configured to supply the light-emitting element with an intermittent driving current that corresponds to a dimming pulse signal; and an on-state detection circuit configured to detect whether or not the light-emitting element has become able to emit light. The current driving circuit comprises: a driving transistor and a current detection resistor arranged between the second terminal of the light-emitting element and a fixed voltage terminal; and an operational amplifier having an inverting input terminal connected to a connection node that connects the driving transistor and the current detection resistor, and having a non-inverting input terminal to which a control voltage indicating the driving current is applied. The on-state detection circuit is configured to compare a voltage at a control electrode of the driving transistor with a predetermined voltage level in a period in which the dimming pulse signal indicates a turn-on instruction, so as to detect whether or not the driving current that flows through the light-emitting element reaches a predetermined level.

Also, the on-state detection circuit may comprise: a P-channel MOSFET having a source connected to a high voltage side power supply terminal of the operational amplifier, and having a gate connected to the control electrode of the driving transistor; a current source arranged between a drain of the P-channel MOSFET and a low voltage side power supply terminal of the operational amplifier; an N-channel MOSFET having a gate connected to the drain of the P-channel MOSFET, and having a source connected to the low voltage side power supply terminal; and a load arranged between a drain of the N-channel MOSFET and the high voltage side power supply terminal. Also, the on-state detection circuit may be configured to output, as a signal which indicates a detection result, a signal that corresponds to a drain voltage of the N-channel MOSFET that develops in a period in which the dimming pulse signal indicates a turn-on instruction.

Also, the on-state detection circuit may further comprise a flip-flop having a data terminal supplied with a drain voltage of the N-channel MOSFET, and having a clock terminal supplied with a signal that corresponds to a logical AND of the dimming pulse signal and a synchronization clock signal. Also, the on-state detection circuit may be configured to output an output signal of the flip-flop as a signal which indicates a detection result.

Yet another embodiment of the present invention relates to a light-emitting apparatus. The light-emitting apparatus comprises: a light-emitting element; and a switching power supply configured to supply a driving voltage to one end of the light-emitting element. Also, the switching power supply may comprise: an output circuit comprising a switching element; and any one of the aforementioned control circuits configured to drive the switching element.

Yet another embodiment of the present invention relates to an electronic device. The electronic device comprises: a liquid crystal panel; and the aforementioned light-emitting apparatus provided as a backlight of the liquid crystal panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 1:
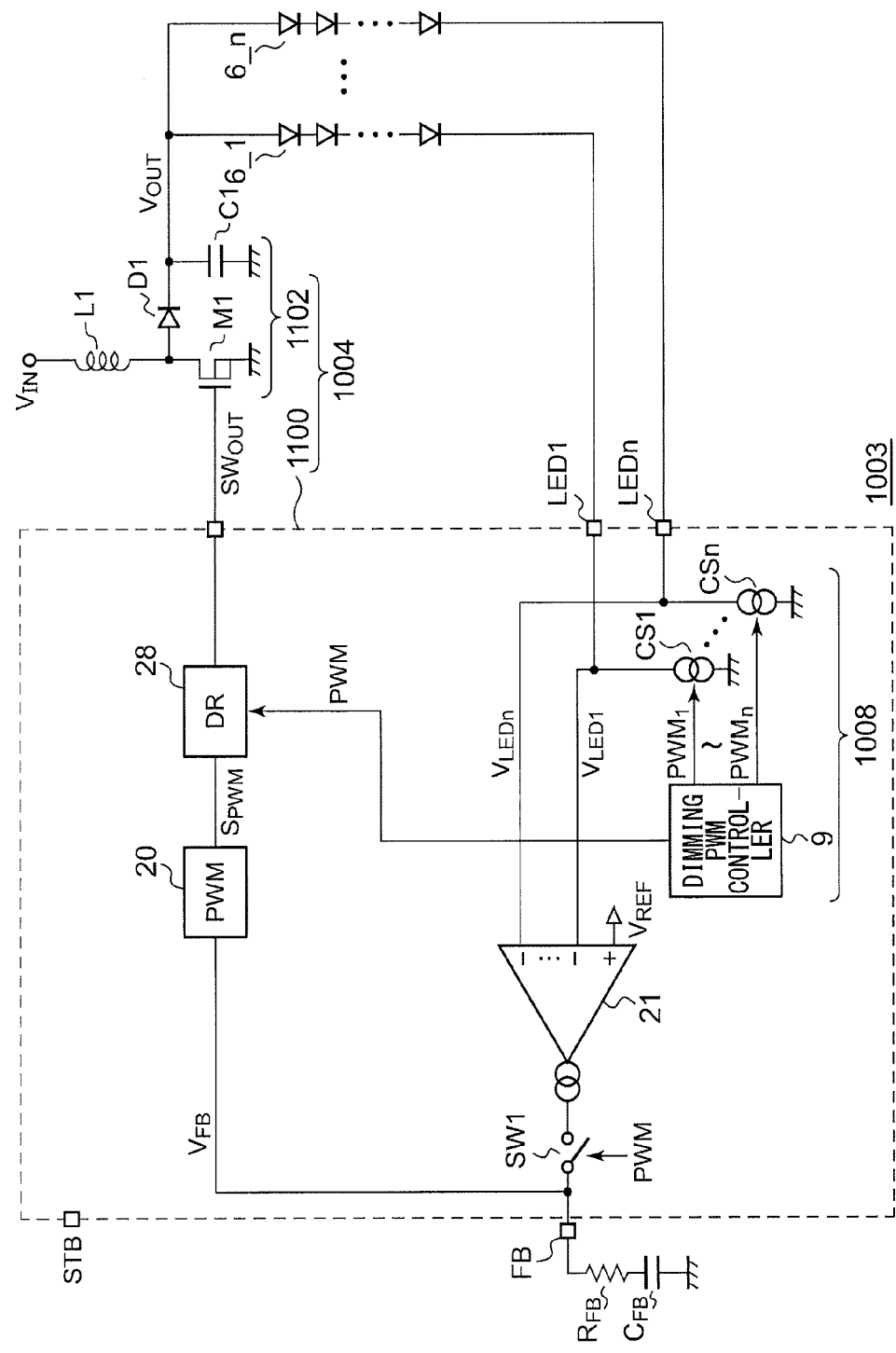
FIG. 1 is a circuit diagram showing an example configuration of a light-emitting apparatus investigated by the present inventor.
Figure 2:
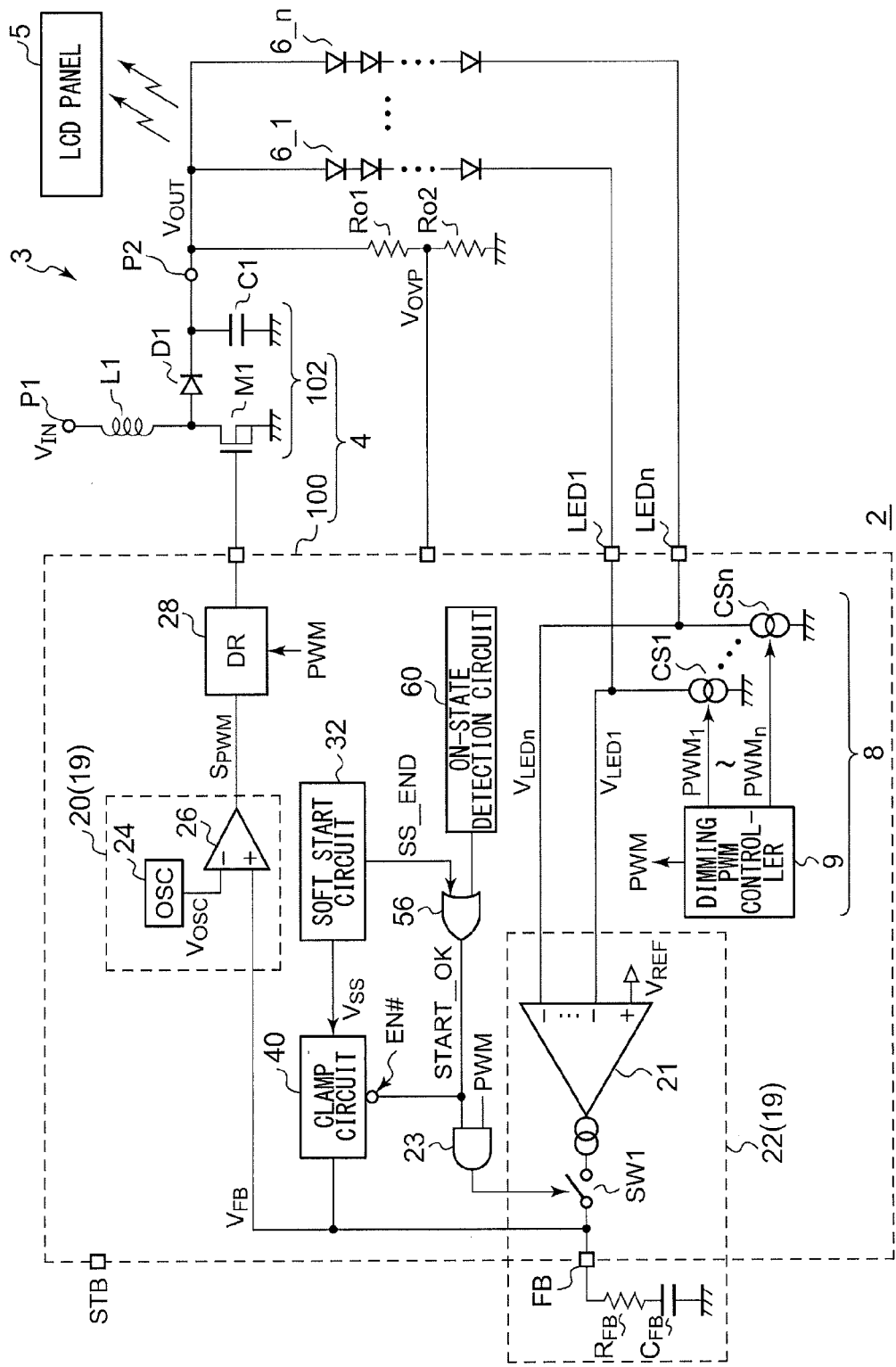
FIG. 2 is a circuit diagram showing a configuration of an electronic device including a switching power supply according to an embodiment.

FIG. 2 is a circuit diagram showing a configuration of an electronic device including a switching power supply according to an embodiment.

An electronic device 2 is configured as a battery-driven device such as a laptop PC, digital still camera, digital video camera, cellular phone terminal, PDA (Personal Digital Assistant), or the like. The electronic device 2 includes a light-emitting apparatus 3 and an LCD (Liquid Crystal Display) panel 5. The light-emitting apparatus 3 is configured as a backlight of the LCD panel 5.

The light-emitting apparatus 3 includes LED strings 6_1 through 6_n each configured as a light-emitting element, a current driving circuit 8, and a switching power supply 4.

Each LED string 6 includes multiple LEDs connected in series. The switching power supply 4 is configured as a step-up DC/DC converter, and is configured to step up an input voltage (e.g., battery voltage) $V_{IN}$ input to the input terminal P1, so as to generate an output voltage (driving voltage) $V_{OUT}$ at an output line connected to an output terminal P2. One end (anode) of each of the multiple LED strings 6_1 through 6_n is connected to a common output line.

The switching power supply 4 includes a control IC 100 and an output circuit 102. The output circuit 102 includes an inductor L1, a rectifier diode D1, a switching transistor M1, and an output capacitor C1. The output circuit 102 has a typical topology, and accordingly, description thereof will be omitted. The present invention is by no means restricted to such a topology. Rather, various changes to such a topology may be made, which can be readily understood by those skilled in this art.

A switching terminal P4 of the control IC 100 is connected to the gate of the switching transistor M1. The control IC 100 is configured to adjust the on/off duty ratio of the switching transistor M1 by means of a feedback control operation so as to generate the output voltage $V_{OUT}$ required to turn on each LED string 6. It should be noted that the switching transistor M1 may be built into the control IC 100.

The current driving circuit 8 is connected to the other end (cathode) of each of the multiple LED strings 6_1 through 6_n. The current driving circuit 8 is configured to supply intermittent driving currents $I_{LED1}$ through $I_{LEDn}$, or otherwise DC driving currents $I_{LED1}$ through $I_{LEDn}$, to the LED strings 6_1 through 6_n, respectively, according to the target luminance level. Specifically, the current driving circuit 8 includes multiple current sources $CS_1$ through $CS_n$ respectively provided to the LED strings 6_1 through 6_n, and a PWM controller 9. The i-th current source $CS_i$ is connected to the cathode of the corresponding i-th LED string 6_i. Each current source $CS_i$ is configured to be capable of switching states between an operating state (active state) $\phi_{ON}$ in which the driving current $I_{LEDi}$ is output and a suspended state $\phi_{OFF}$ in which the output of the driving current $I_{LEDi}$ is suspended, according to the control signal $PWM_i$ output from the PWM controller 9. The PWM controller 9 is configured to generate control signals $PWM_1$ through $PWM_n$ having a duty ratio that corresponds to the target luminance level, and to output the control signals $PWM_1$ through $PWM_n$ thus generated to the current sources $CS_1$ through $CS_n$. During a period (on-period $T_{ON}$) in which the control signal $PWM_i$ is asserted (e.g., set to high level), the corresponding current source CS, is set to the operating state $\phi_{ON}$, thereby turning on the LED string 6_i. During a period (off-period $T_{OFF}$) in which the control signal $PWM_i$ is negated (e.g., set to low level), the corresponding current source $CS_i$ is set to the suspended state $\phi_{OFF}$, thereby turning off the LED string 6_i. By adjusting the time ratio between the on-period $T_{ON}$ and the off-period $T_{OFF}$, such an arrangement is capable of controlling the effective value (time average) of the driving current $I_{LED}$ that flows through the LED string 6_i, thereby adjusting the luminance level. The current driving circuit 8 is configured to perform a PWM driving operation with a driving frequency of several tens through several hundreds of Hz.

The current driving circuit 8 is integrated in the control IC 100. Also, the control IC 100 and the current driving circuit 8 may be integrated as separate chips. Also, the control IC 100 and the current driving circuit 8 may be configured as a single package (module), or otherwise as separate packages.

The above is the overall configuration of the light-emitting apparatus 3. Next, description will be made regarding the configuration of the control IC 100. The control IC 100 includes LED terminals $LED_1$ through $LED_n$ respectively provided to the LED strings 6_1 through 6_n. Each LED terminal $LED_1$ is connected to the cathode electrode of the corresponding LED string 6_i. It should be noted that such an arrangement does not necessarily include multiple LED strings. Also, such an arrangement may include a single LED string 6 alone.

The control IC 100 mainly includes a pulse generating unit 19, a driver 28, a soft-start circuit 32, a clamp circuit 40, and an on-state detection circuit 60.

During the on-period $T_{ON}$ of the LED strings 6, the pulse generating unit 19 is configured to generate the pulse signal $S_{PWM}$ having a duty ratio which is adjusted such that the detection voltage that corresponds to the output voltage $V_{OUT}$ matches a predetermined reference voltage $V_{REF}$. In FIG. 2, the detection voltage is the lowest from among the voltages (LED terminal voltages) $V_{LED1}$ through $V_{LEDn}$ that occur at the cathode electrodes of the LED strings 6, which will be referred to as "$V_{LED}$" hereafter.

During the period $T_{ON}$ in which the dimming control pulse signal PWM indicates a turn-on instruction, the driver 28 is configured to generate a switching signal SWOUT according to the pulse signal $S_{PWM}$ so as to drive the switching transistor M1. Furthermore, during the period $T_{OFF}$ in which the dimming control pulse signal PWM indicates a turn-off instruction, the driver 28 is configured to fix the switching transistor M1 to the off state.

During the on-period $T_{ON}$, the control IC 100 is configured to optimize the output voltage $V_{OUT}$ of the switching power supply 4 for driving the LED strings 6_1 through 6_n. During the off-period $T_{OFF}$, the driving currents $I_{LED1}$ through $I_{LEDn}$ to be respectively supplied to the LED strings 6_1 through 6_n are each set to zero. That is to say, during the off-period $T_{OFF}$, the switching power supply 4 is set to the no-load state. With such a driver 28, the control IC 100 is configured to suspend the switching of the switching transistor M1 during the off-period $T_{OFF}$.

Next, description will be made regarding the configuration of the pulse generating unit 19. The pulse generating unit 19 includes an error amplifier 22 and a pulse modulator 20. During the on-period of the LED strings 6, the error amplifier 22 is configured to amplify the difference between the detection voltage $V_{LED}$ and the reference voltage $V_{REF}$ so as to generate the feedback voltage $V_{FB}$ according to the difference between them.

The error amplifier 22 includes a gm amplifier 21, a feedback switch SW1, a phase compensation resistor $R_{FB}$, and a capacitor $C_{FB}$. The control IC 100 includes an FB terminal. The resistor $R_{FB}$ and the capacitor $C_{FB}$ are connected in series between the FB terminal and an external ground terminal.

The gm amplifier 21 is configured to output a current (in the form of a source current or otherwise a sink current) according to the difference between the detection voltage $V_{LED}$ that occurs between the respective terminals of the current source CS and a predetermined reference voltage $V_{REF}$. Specifically, the gm amplifier 21 includes multiple inverting input terminals (−) and a single non-inverting input terminal (+). The LED terminal voltages $V_{LED1}$ through $V_{LEDn}$ are respectively input to the multiple input terminals, and the reference voltage $V_{REF}$ is input to the non-inverting input terminal. The error amplifier 22 is configured to generate a current that corresponds to the difference between the lowest LED terminal voltage (detection voltage) $V_{LED}$ and the reference voltage $V_{REF}$.

The feedback switch SW1 is arranged between the FB terminal and the output terminal of the gm amplifier 21, and is configured to turn on according to the dimming pulse signal PWM. The dimming pulse signal PWM is configured as the logical OR of the dimming pulse signals $PWM_1$ through $PWM_n$ of the respective channels. When at least one channel of the dimming pulse signals $PWM_1$ through $PWM_n$ indicates the on-period, the dimming pulse signal PWM is set to a predetermined level (e.g., set to high level).

When the standby signal STB indicates an instruction to restore the state to the normal operating state from the standby state, the soft start circuit 32 is configured to generate a soft start signal $V_{SS}$ which changes with time. Furthermore, the soft start circuit 32 is configured to output a soft start completion signal (SS_END signal) which is asserted (set to high level) when the soft start signal $V_{SS}$ reaches a predetermined threshold voltage.

The on-state detection circuit 60 is configured to detect whether or not the driving voltage $V_{OUT}$ has risen to a voltage level which allows the LED strings 6 to emit light. Specifically, the on-state detection circuit 60 is configured to output a flag signal (LED_ON_ALL) which is asserted (set to high level) when it detects that the driving voltage $V_{OUT}$ has risen to this voltage level. When the driving voltage $V_{OUT}$ is higher than a level which allows at least one LED string 6 to emit light, the LED_ON_ALL signal is set to high level. Otherwise, the LED_ON_ALL signal is set to low level. That is to say, when at least one LED string 6 becomes able to emit light, the LED_ON_ALL signal is asserted (set to high level).

An OR gate 56 is configured to generate the logical OR of the LED_ON_ALL signal and the SS_END signal, so as to generate a START_OK signal. That is to say, the START_OK signal is set to low level immediately after the start-up operation. Subsequently, when the soft-start operation is completed, or otherwise when at least one LED is turned on, the START_OK signal transits to high level.

After the switching power supply 4 is started up, i.e., during a predetermined period after the standby signal STB indicates an instruction for restoration from the standby state to the operating state, the clamp circuit 40 enters the active state. In the active state, the clamp circuit 40 is configured to control the feedback voltage $V_{FB}$ that develops at the FB terminal such that it becomes equal to the soft start voltage $V_{SS}$ regardless of the detection voltage $V_{LED}$ level. The clamp circuit 40 includes an enable terminal EN# (logical inversion). During a period in which a signal input to the enable terminal EN# is low level, the clamp circuit 40 is set to the active state. With the present embodiment, the START_OK signal is input to the enable terminal EN#.

An AND gate 23 is configured to control the feedback switch SW1 according to the logical AND of the START_OK signal and the dimming pulse signal PWM. With such an arrangement, the feedback switch SW1 is turned on when the START_OK signal is high level, i.e., when the clamp circuit 40 is in the inactive state in the period $T_{ON}$ in which the dimming pulse signal PWM indicates a turn-on instruction.

The pulse modulator 20 is configured as a pulse width modulator, for example. The pulse modulator 20 is configured to generate a pulse signal $S_{PWM}$ having a duty ratio that corresponds to the feedback voltage $V_{FB}$, and having a fixed cycle. Specifically, the pulse signal $S_{PWM}$ is configured to have a duty ratio which is increased according to an increase in the feedback voltage $V_{FB}$.

For example, the pulse modulator 20 includes an oscillator 24 and a PWM comparator 26. The oscillator 24 is configured to generate a cyclic voltage $V_{OSC}$ having a triangle waveform or otherwise a sawtooth waveform. The PWM comparator 26 is configured to compare the feedback voltage $V_{FB}$ with the cyclic voltage $V_{OSC}$, and to generate the PWM signal $S_{PWM}$ having a level that is adjusted according to the comparison result. It should be noted that a pulse frequency modulator or the like may be employed as the pulse modulator 20. The PWM signal $S_{PWM}$ is configured to have a frequency that is sufficiently higher than the PWM driving frequency employed in the current driving circuit 8, i.e., that is on the order of several hundred kHz (e.g. 600 kHz).

Figure 3:
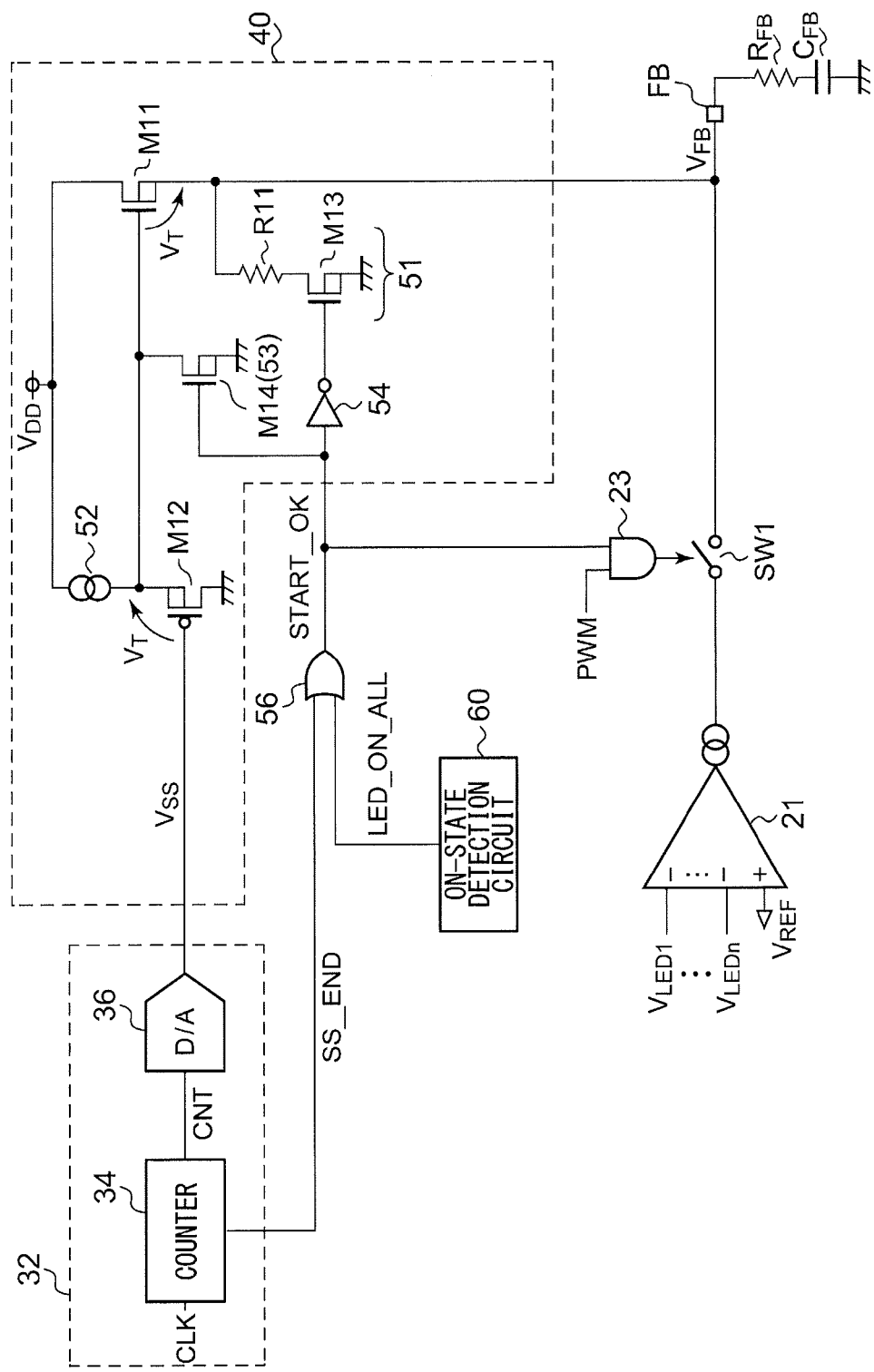
FIG. 3 is a circuit diagram showing an example configuration of a clamp circuit shown in FIG. 2.

FIG. 3 is a circuit diagram showing an example configuration of the clamp circuit 40 shown in FIG. 2. The clamp circuit 40 mainly includes a first transistor M11 configured as an N-channel MOSFET, and a second transistor M12 configured as a transistor that is complementary to the first transistor M11, i.e., configured as a P-channel MOSFET. The first transistor M11 is configured to have a first electrode (source) connected to the FB terminal. The second transistor M12 is configured to have a source connected to a control electrode (gate) of the first transistor, and to have a control electrode (gate) supplied with the soft start voltage $V_{SS}$.

An impedance circuit 51 is provided as a load for the first transistor M11. The impedance circuit 51 is arranged between the FB terminal and a fixed voltage terminal (ground terminal). The impedance circuit 51 includes a resistor 11 and a switch M13. An inverter 54 is configured to invert the START_OK signal, and to input the START_OK signal thus inverted to the gate of the switch M13. With such an arrangement, the switch M13 is controlled such that it is turned on during a period in which the clamp circuit 40 is in the active state.

A current source 52 is arranged as a load for the second transistor M12 between the source of the second transistor M12 and a fixed voltage terminal (power supply terminal).

With the respective gate-source voltages of the first transistor M11 and the second transistor M12 as $V_T$, the source voltage of the transistor M12, i.e., the gate voltage of the transistor M11, is represented by $V_{SS}+V_T$. The voltage at the FB terminal is $V_T$ lower than the gate voltage of the transistor M11. Thus, the voltage at the FB terminal becomes equal to the soft start voltage $V_{SS}$.

During a period in which the clamp circuit is in the inactive state, an off circuit 53 is configured to fix the gate voltage of the first transistor M11 to a level which turns off the first transistor M11. For example, the off circuit 53 is arranged between the gate of the first transistor M11 and a fixed voltage terminal (ground terminal), and is configured as an N-channel MOSFET (transistor M14) having its control electrode supplied with the START_OK signal. When the START_OK signal is switched to high level, the transistor M14 is turned on, which turns off the first transistor M11.

During a period in which the driving current $I_{LED}$ that flows through the LED string 6 is lower than a predetermined level, the clamp circuit 40 is set to the active state, and during a period in which the driving current $I_{LED}$ is higher than the predetermined level, the clamp circuit 40 is set to the inactive state. From another viewpoint, during a period before the LED string 6 becomes able to emit light, the clamp circuit 40 is set to the active state, and after the LED string 6 becomes able to emit light, the clamp circuit 40 is set to the inactive state.

The soft start circuit 32 may include: a digital counter 34 configured to count up according to a clock signal CLK after the standby signal STB is switched to high level; and a D/A converter 36 configured to convert the count value of the counter 34 into an analog voltage so as to generate the soft start voltage $V_{SS}$. The counter 34 is configured to generate the SS_END signal which is set to high level when the count value CNT reaches a predetermined value. When the soft start voltage $V_{SS}$ is lower than the predetermined level, the SS_END signal is set to low level. When the soft start voltage $V_{SS}$ is higher than the predetermined level, the SS_END signal is set to high level.

The soft start circuit 32 may be configured as a combination of a capacitor and a circuit configured to charge or discharge the capacitor.

Figure 4:
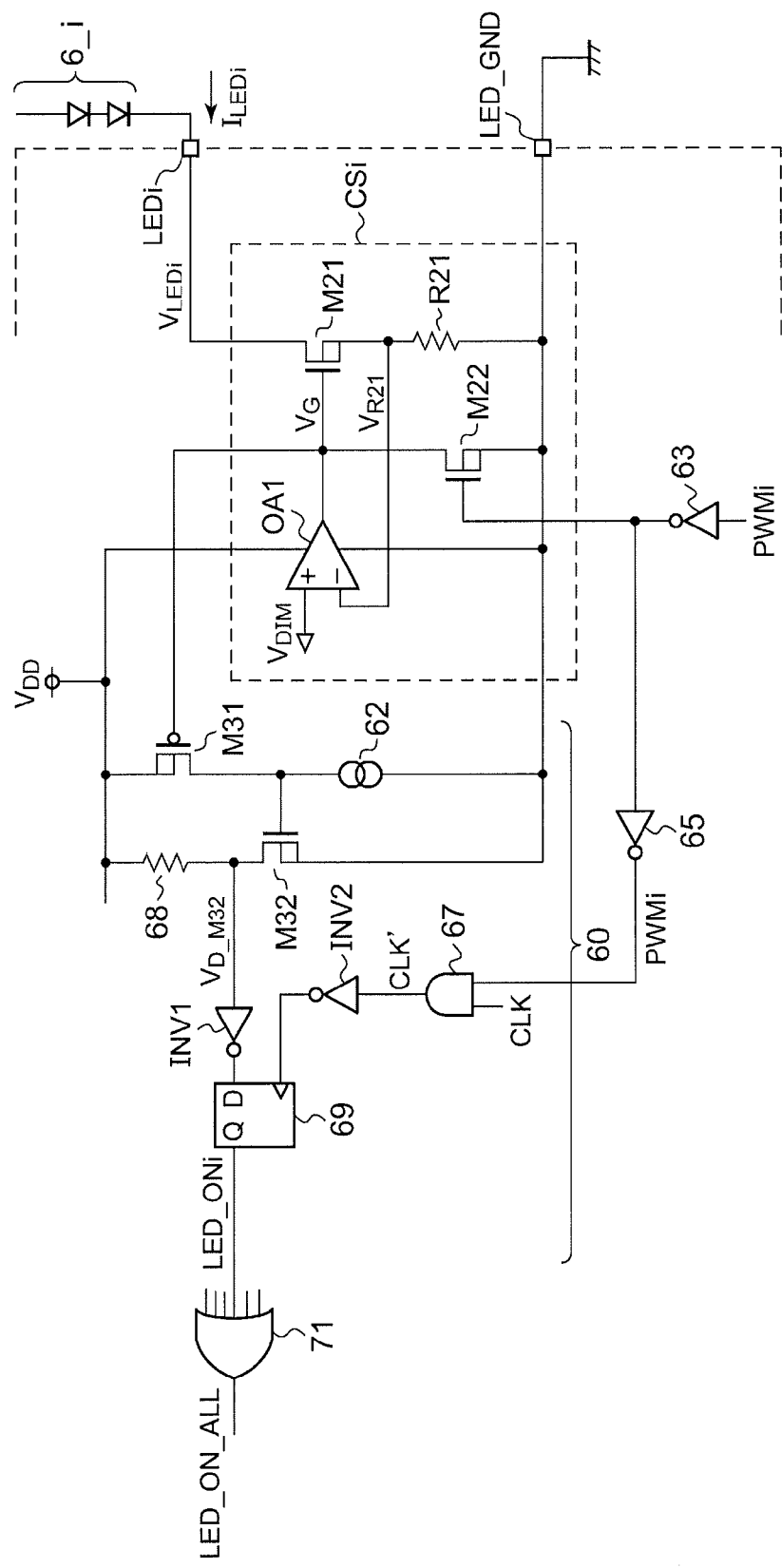
FIG. 4 is a circuit diagram showing the configurations of an on-state detection circuit and a current source.

Next, description will be made regarding the operation of the on-state detection circuit 60 for generating the LED_ON_ALL signal. FIG. 4 is a circuit diagram showing the configurations of the on-state detection circuit 60 and the current source $CS_i$. Specifically, FIG. 4 shows a configuration of one channel (i-th channel) of a total of n channels. The current source $CS_i$ included in the current driving circuit 8 includes a driving transistor M21, a current detection resistor R21, an operational amplifier OA1, and a dimming switch M22.

A ground terminal LED_GND is connected to an external ground terminal. The driving transistor M21 and the current detection resistor R21 are sequentially connected in series between the LED terminal $LED_i$, which is a cathode of the LED string 6, and the ground terminal LED_GND. The operational amplifier OA1 is configured to have its inverting terminal connected to a connection node that connects the driving transistor M21 and the current detection resistor R21, and to have its non-inverting input terminal supplied with a control voltage $V_{DIM}$ which indicates the driving current The driving current $I_{LEDi}$ is generated by means of the current source $CS_i$.

$$I_{LEDi}=V_{DIM}/R11.$$

A dimming switch M22 is arranged between a control electrode (gate) of the driving transistor M21 and the ground terminal LED_GND, and is configured such that its on/off operation is controlled according to the dimming pulse signal $PWM_i$. An inverter 63 is configured to invert the dimming pulse signal $PWM_i$, and to input the dimming pulse signal $PWM_i$ thus inverted to the gate of the dimming switch M22. During a period (off-period $T_{OFF}$) in which the dimming pulse signal $PWM_i$ is set to low level, the dimming switch M22 turns on. This switches the gate of the driving transistor M21 to low level, which turns off the driving transistor M21.

During the on-period $T_{ON}$ in which the dimming pulse signal $PWM_i$ indicates a turn-on instruction, the on-state detection circuit 60 is configured to compare the gate voltage $V_G$ of the driving transistor M21 with a predetermined level Va, so as to detect whether or not the driving current $I_{LEDi}$ that flows through the LED string 6, reaches a predetermined level. When $V_G$>Va, the $LED\_ON_i$ signal which indicates the detection result is set to low level. When $V_G$<Va, the $LED\_ON_i$ signal is set to high level.

Specifically, the on-state detection circuit 60 includes a transistor M31, a current source 62, a resistor 68, and a transistor M32. The transistor M31 is configured as a P-channel MOSFET, and is configured to have its source connected to a high voltage side power supply terminal $V_{DD}$ of the operational amplifier OA1, and to have its gate connected to the control electrode (gate) of the driving transistor M21. The current source 62 is arranged between the drain of the transistor M31 and a low voltage side power supply terminal (LED_GND) of the operational amplifier OA1. The transistor M32 is configured as an N-channel MOSFET, and is configured to have its gate connected to the drain of the transistor M31, and to have its source connected to the low voltage side power supply terminal (LED_GND). The resistor 68 is arranged as a load for the transistor M32 between the drain of the transistor M32 and the high voltage side power supply terminal $V_{DD}$.

The on-state detection circuit 60 is configured to generate the $LED\_ON_i$ signal according to the drain voltage $V_{D\_M32}$ of the transistor M32. An inverter 65 is configured to invert the output of the inverter 63. The output signal of the inverter 65 has the same logical level as that of the dimming pulse signal PWM. An AND gate 67 is configured to generate the logical AND of the dimming pulse signal $PWM_i$ configured as the output of the inverter 65 and the synchronization clock CLK. An inverter INV2 is configured to invert the output signal of the AND gate 67, and to supply its output signal thus inverted to the clock terminal of a flip-flop 69. An inverter INV1 is configured to invert the drain voltage $V_{D\_M32}$ of the transistor M32, and to supply its output (the inverted drain voltage $V_{D\_M32}$) to the data terminal (D) of a flip-flop 69. The output signal of the flip-flop 69 is used as the $LED\_ON_i$ signal. When the driving current $I_{LEDi}$ having a predetermined level flows through the i-channel LED string 6, i.e., when the output voltage $V_{OUT}$ is greater than a predetermined voltage level, the $LED\_ON_i$ signal is asserted (set to high level).

An OR gate 71 is configured to generate the logical OR of all the channels of the $LED\_ON_1$ signal through $LED\_ON_n$, so as to generate the LED_ON_ALL signal.

The above is the configuration of the light-emitting apparatus 3. Next, description will be made regarding the operation thereof.

Figure 5:
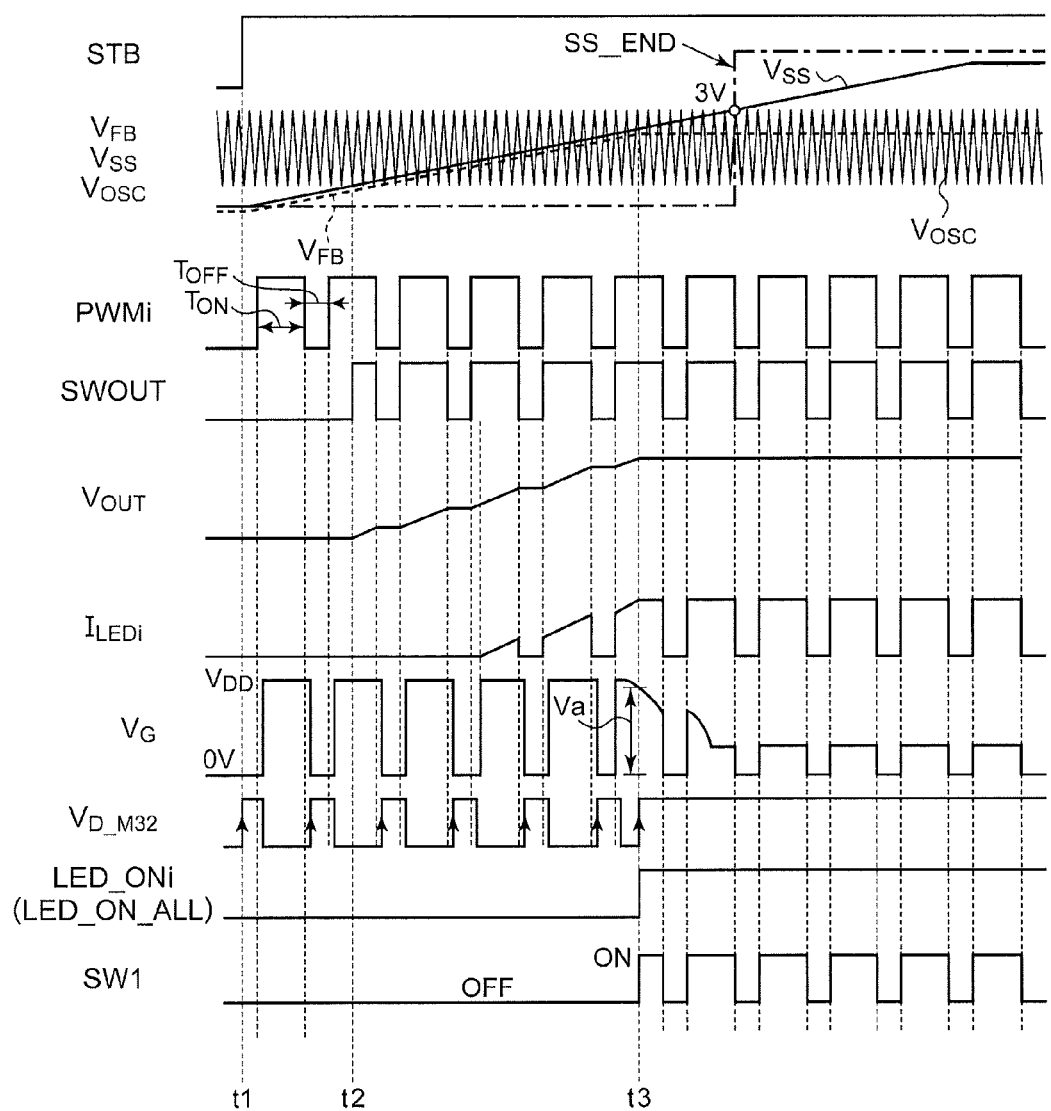
FIG. 5 is a waveform diagram showing the operation of a light-emitting apparatus shown in FIG. 2.

FIG. 5 is a waveform diagram showing the operation of the light-emitting apparatus 3 shown in FIG. 2. At the time point t1, the standby signal STB transits to high level, which instructs the switching power supply 4 to start up. Immediately after the startup operation, the soft start voltage $V_{SS}$ starts to rise. In this stage, the clamp circuit 40 is set to the active state. Accordingly, the feedback voltage $V_{FB}$ rises according to an increase in the soft start voltage $V_{SS}$. Thus, the duty ratio of the pulse signal $S_{PWM}$ is increased according to an increase in the soft start voltage $V_{SS}$.

When the feedback voltage $V_{FB}$ becomes higher than the lower limit level of the cyclic voltage $V_{OSC}$ (time point t2), the pulse signal $S_{PWM}$ is generated. With such an arrangement, during a period in which the dimming pulse signal $PWM_i$ indicates the on-period $T_{ON}$, the driver 28 generates the switching signal SWOUT, thereby switching the transistor M1. The switching signal SWOUT is pulse modulated with a frequency that is higher than that of the dimming pulse signal $PWM_i$. However, such high-frequency pulse modulation of the switching signal SWOUT is not shown in FIG. 5.

During a period in which the switching transistor M1 performs the on/off switching operation, the output voltage $V_{OUT}$ rises. It should be noted that, during a period in which the output voltage $V_{OUT}$ is insufficient, the driving current $I_{LEDi}$ does not flow even in the on-period $T_{ON}$. Before the driving current $I_{LEDi}$ starts to flow, the gate voltage $V_G$ of the driving transistor M21 alternately and repeatedly switches between a high level ($V_{DD}$) that corresponds to the on-period $T_{ON}$ and a low level (0 V) that corresponds to the off-period $T_{OFF}$ in synchronization with the dimming pulse signal $PWM_i$.

The driving current $I_{LEDi}$ increases according to an increase in the output voltage $V_{OUT}$. The gate voltage $V_G$ applied to the driving transistor M21 in the on-period $T_{ON}$ falls according to an increase in the driving current $I_{LEDi}$. When the driving current $I_{LEDi}$ reaches a predetermined level, the gate voltage $V_G$ drops to a predetermined level Va. In this state, the drain voltage $V_{D\_M32}$ of the transistor M32 is set to high level. The flip-flop 69 acquires the high-level drain voltage $V_{D\_M32}$ according to the synchronization clock CLK, which sets the $LED\_ON_i$ signal to high level. That is to say, such an arrangement detects that the driving current $I_{LEDi}$ having a predetermined level starts to flow (time point t3).

When the $LED\_ON_i$ signal is set to high level, the clamp circuit 40 is switched to the inactive state, and the feedback switch SW1 is turned on. This enables the feedback operation which is performed according to the detection voltage. In this state, the feedback voltage $V_{FB}$ switched to a level that corresponds to the difference between the detection voltage $V_{LED}$ and the reference voltage $V_{REF}$.

The above is the startup operation of the light-emitting apparatus 3.

With the light-emitting apparatus 3, even in a case in which the dimming pulse signal PWM has a small duty ratio, when the light-emitting apparatus 3 is restored from the standby state, such an arrangement is capable of raising the feedback voltage $V_{FB}$, i.e., the duty ratio of the pulse signal $S_{PWM}$, according to an increase in the soft start voltage $V_{SS}$. Thus, such an arrangement requires only a short period of time to raise the output voltage $V_{OUT}$. Furthermore, with the light-emitting apparatus 3, after a predetermined period of time elapses after the switching power supply 4 starts to operate, the clamp circuit 40 is set to the inactive state so as to disable the control operation in which the feedback voltage $V_{FB}$ is controlled according to the soft start voltage $V_{SS}$. Thus, such an arrangement is capable of switching the feedback control operation such that the detection voltage $V_{LED}$ approaches the reference voltage $V_{REF}$.

Immediately before the switching of the feedback control operation, the feedback voltage $V_{FB}$ has the same voltage level as that of the soft start voltage $V_{SS}$. After the switching of the feedback control operation, the feedback voltage $V_{FB}$ has a voltage level which is determined according to the difference between the detection voltage $V_{LED}$ and the reference voltage $V_{REF}$. With such a circuit, when the driving current $I_{LED}$ having a predetermined level starts to flow, the feedback control operation is switched. Thus, such an arrangement allows the two voltage levels to become close to each other. Thus, such an arrangement prevents a large change in the feedback voltage $V_{FB}$ between before and after the switching, thereby suppressing fluctuation in the output voltage $V_{OUT}$.

The on-state detection circuit 60 for the clamp circuit 40 is configured to detect, based on the voltage $V_G$ at the control electrode of the driving transistor M21, whether or not the driving current $I_{LED}$ having a predetermined level starts to flow. Such an arrangement provides the following advantage in comparison with an arrangement in which the detection is made based on the OVP voltage $V_{OVP}$ that corresponds to the output voltage $V_{OUT}$.

The voltage drop (forward voltage) $V_F$, which occurs when the driving current $I_{LED}$ having a predetermined level flows through the LED string 6, varies depending on the magnitude of the driving current $I_{LED}$ and the number of LEDs included in the LED string 6. Thus, in a case in which detection is made based on the OVP voltage $V_{OVP}$ whether or not the driving voltage $V_{OUT}$ has risen up to a sufficient level, there is a need to optimize the threshold level to be compared with the OVP voltage $V_{OVP}$, according to the LED string 6. In contrast, with a detection method based on the voltage at the control electrode of the driving transistor M21, there is no need to adjust the threshold level according to the LED string 6, which is an advantage. This is a very important advantage in designing a control IC 100 which is required to have high compatibility for supporting various kinds of LED strings 6.

Next, description will be made regarding a technique for detecting an open fault, a short-circuit fault, and a non-connection state, for each channel of the LED strings 6. Such a technique may be combined with the control IC 100 described above. Also, such a technique may be employed separately from the control IC 100 described above.

Figure 6:
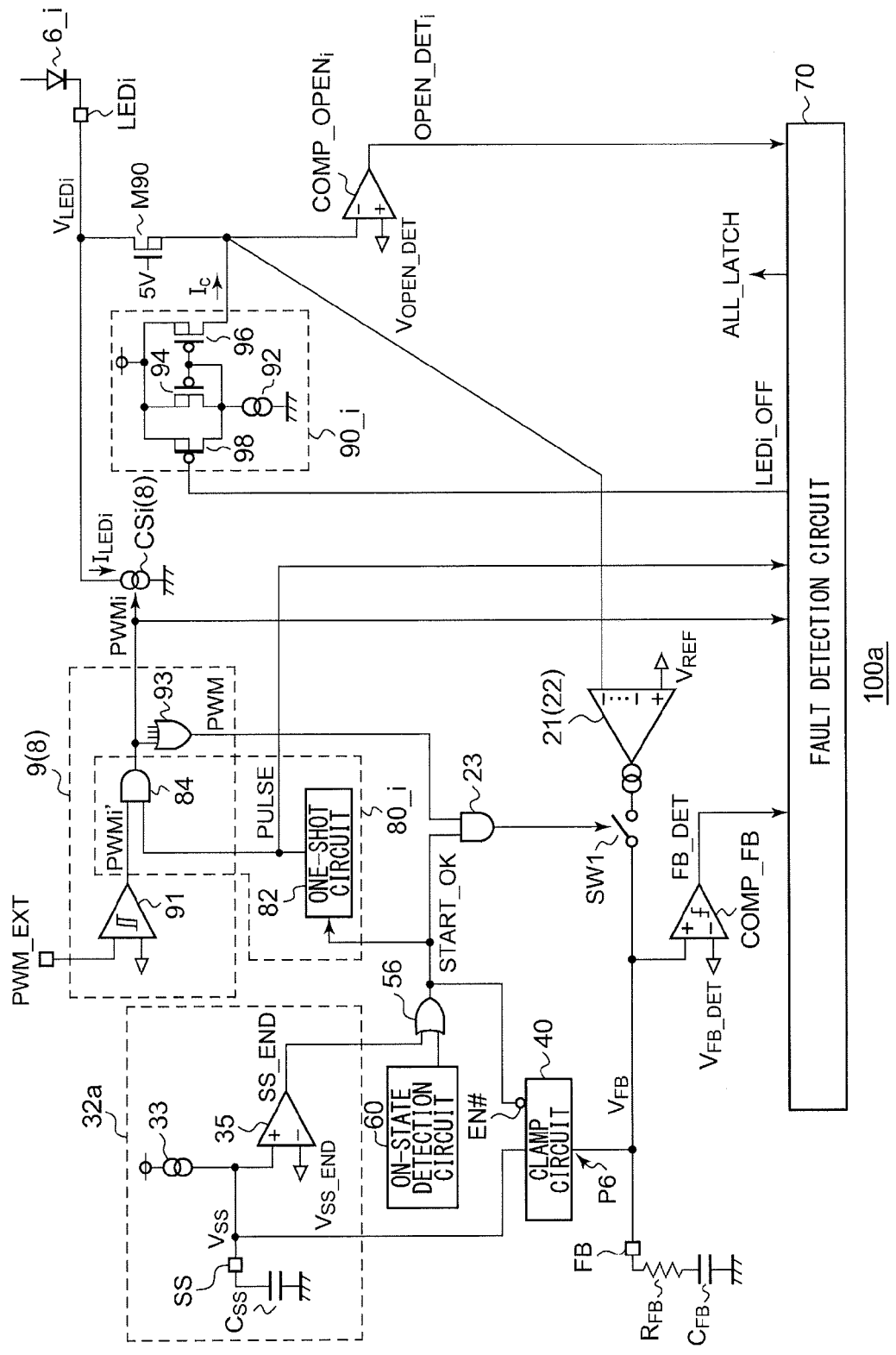
FIG. 6 is a circuit diagram showing a configuration of a control IC according to an embodiment.

FIG. 6 is a circuit diagram showing a configuration of a control IC 100a according to an embodiment. FIG. 6 shows only a single channel, i.e., the i-th channel, as a representative example.

The control IC 100a mainly includes fault detection comparators COMP_OPEN$_i$ provided for the respective channels, forced turn-off circuits 80_i provided for the respective channels, pull-up circuits 90_i provided for the respective channels, and a fault detection circuit 70, in addition to the configuration described above.

Each fault detection comparator COMP_OPEN$_i$ is configured to compare the detection voltage $V_{LEDi}$ at the corresponding LED terminal (connection terminal) LED$_i$ with a predetermined threshold voltage $V_{OPEN\_DET}$. A transistor M90 is arranged between the input terminal of the fault detection comparator COMP_OPEN$_i$ and the LED terminal LED$_i$. When a high-level voltage $V_{REG}$ (having a voltage level of 5 V, for example) is input to the gate of the transistor M90, the transistor M90 is turned on, and the detection voltage $V_{LEDi}$ is input to the fault detection comparator COMP_OPEN$_i$.

The threshold voltage $V_{OPEN\_DET}$ is set to a voltage on the order of 0.2 V, for example. With such an arrangement, the fault detection comparator COMP_OPEN$_i$ is configured to generate a fault detection signal OPEN_DET$_i$ which is asserted (e.g., set to high level) when $V_{LEDi} < V_{OPEN\_DET}$.

A feedback voltage comparator COMP_FB is configured to compare the feedback voltage $V_{FB}$ that develops at the FB terminal with a predetermined threshold voltage $V_{FB\_DET}$. The threshold voltage $V_{FB\_DET}$ is set to a value on the order of 4 V, for example. With such an arrangement, the feedback voltage comparator COMP_FB is asserted when $V_{FB} > V_{FB\_DET}$. If the detection voltage $V_{LEDi}$ falls to the vicinity of the ground voltage in a fault in the feedback operation for the i-th channel due to a malfunction or the like, the feedback voltage $V_{FB}$ rises to the high level. That is to say, by means of the feedback voltage comparator COMP_FB, such an arrangement is also capable of detecting whether or not the detection voltage $V_{LEDi}$ is outside the normal range of the detection voltage $V_{LEDi}$.

During a predetermined period $\tau_{DET}$ after the switching power supply 4 starts to operate, the forced turn-off circuit 80 is configured to instruct the current driving circuit 8 to suspend the generation of the driving current $I_{LED}$. For example, the forced turn-off circuit 80 is configured to receive the aforementioned START_OK signal as a trigger for suspending the generation of the driving current $I_{LED}$. When the START_OK signal transits from low level to high level (asserted), i.e., after a predetermined period of time elapses after the switching power supply 4 is started up, i.e., when the current that flows through the LED string 6 reaches a predetermined level, or otherwise when the soft start voltage $V_{SS}$ reaches a predetermined level, such an arrangement instructs the current source CS$_i$ to suspend the generation of the driving current $I_{LEDi}$. Such a trigger signal is not restricted to the START_OK signal. Rather, various kinds of other signals that are asserted at a given time point after the switching power supply 4 is started up may be employed as such a trigger. Examples of such signals include the SS_END signal, LED_ON signal, and the like.

The PWM controller 9 includes a hysteresis comparator 91 and an OR gate 93, for example. The hysteresis comparator 91 is configured to compare a dimming pulse signal PWM_EXT received from an external circuit with a threshold voltage, so as to generate a dimming pulse signal PWM$_i$' for each channel. The OR gate is configured to receive the dimming pulse signals PWM$_1$ through PWM$_n$ for all the channels, and to generate the dimming pulse signal PWM which is the logical OR of these signals.

The forced turn-off circuit 80 includes a one-shot circuit 82 and an AND gate 84, for example. The one-shot circuit 82 is configured to generate a pulse signal PULSE which is set to low level during a predetermined period $\tau_{DET}$ when the START_OK signal employed as a trigger is asserted. The AND gate 84 is configured to generate the dimming pulse signal PWM$_i$ which is the logical AND of the dimming pulse signal PWM$_i$' and the pulse signal PULSE. The dimming pulse signal PWM$_i$ is set to low level during the predetermined period of time $\tau_{DET}$ regardless of the level of the dimming pulse signal PWM$_i$', which instructs the current source CS$_i$ to suspend the generation of the driving current I$_{LEDi}$. It should be noted that the configuration of the forced turn-off circuit 80 is not restricted to such an arrangement shown in FIG. 6.

A soft start circuit 32*a* shown in FIG. 6 includes a capacitor C$_{SS}$, a current source 33, and a comparator 35. By charging the capacitor C$_{SS}$ by means of the current source 33, such an arrangement such an arrangement generates the soft start voltage V$_{SS}$ at the capacitor C$_{SS}$ such that it rises with time. The comparator 35 is configured to compare the soft start voltage V$_{SS}$ with a threshold voltage V$_{SS\_END}$ and to generate a soft start end signal (SS_END signal) which is asserted (set to high level) when V$_{SS}$>V$_{SS\_END}$. It is needless to say that the soft start circuit 32 shown in FIG. 3 or other circuit configurations may be employed instead of the soft start circuit 32*a*.

The pull-up circuit 90 is configured to be switchable between the active state and the inactive state. In the active state, the pull-up circuit 90 is configured to supply a current to the LED terminal LED$_i$, thereby pulling up the voltage at the LED terminal LED$_i$. The switching between the active state and the inactive state of the pull-up circuit 90 are controlled according to an LEDi_OFF signal described later.

Description will be made regarding an example configuration of the pull-up circuit 90. A current source 92 is configured to generate a current Ic. Transistors 94 and 96 form a current mirror circuit configured to duplicate the current Ic. The current Ic is supplied to the LED terminal LED$_i$ via the transistor M90. A transistor 98 is arranged between the gate and the source of the transistor M94. When the transistor 98 is turned on, the transistors 94 and 96 are turned off. In this state, the output current Ic of the pull-up circuit 90 becomes zero.

The fault detection circuit 70 is configured to receive, as input signals, fault detection signals OPEN_DET$_1$ through OPEN_DET$_n$ for the respective channels, a feedback detection signal FB_DET, and the dimming pulse signals PWM$_1$ through PWM$_n$ for the respective channels. The fault detection circuit 70 is configured to switch the pull-up circuit 90 between the active state and the inactive state, and to perform a protection operation or a specified control operation, according to the signal thus received. Specifically, the fault detection circuit 70 is configured to generate an LED off signal (LEDi_OFF signal) for each channel such that it is asserted when the light-emitting operation of the corresponding LED string 6_*i* is to be stopped, and an all-latch signal (ALL_LATCH signal) which is asserted when the light-emitting operation is to be stopped for all channels of the LED strings 6_1 through 6_*n*.

Figure 7:
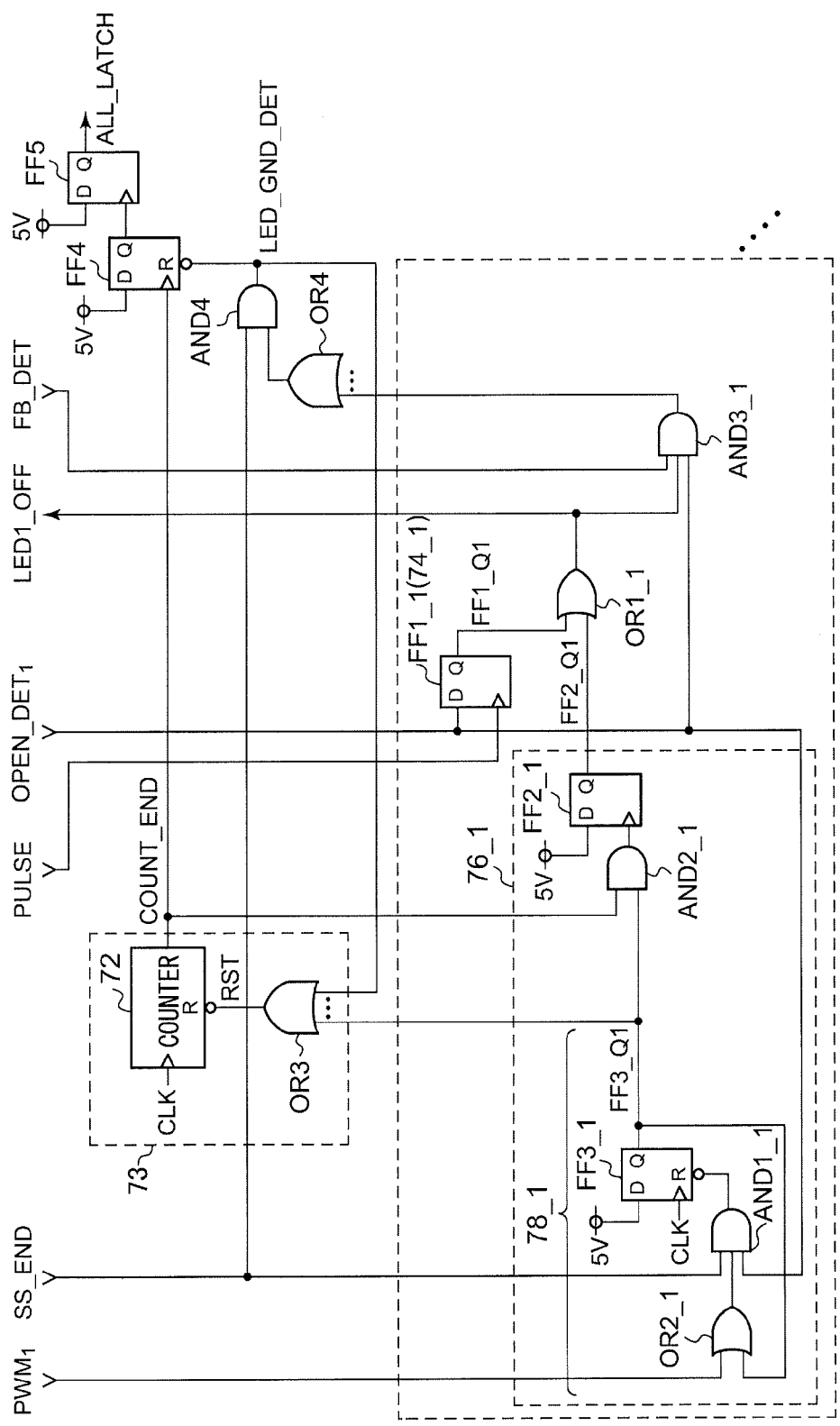
FIG. 7 is a circuit diagram showing a specific example configuration of a fault detection circuit shown in FIG. 6.

Next, description will be made regarding the function and the configuration of the fault detection circuit 70. FIG. 7 is a circuit diagram showing a specific example configuration of the fault detection circuit 70 shown in FIG. 6. FIG. 7 shows a configuration in detail for the first channel only. The other channels have the same configuration as that of the first channel.

The fault detection circuit 70 is configured to have a fault (open fault, ground fault) detection function in the startup operation, and a fault (open fault, ground fault) detection function in the normal operating state.

The fault detection circuit 70 includes first detection units 74*i*, second detection units 76_*i*, first OR gates OR1_*i* and third AND gates AND3_*i*, provided for the respective channels. Furthermore, the fault detection circuit 70 includes a counter 72, a third OR gate OR3, a fourth OR gate OR4, a fourth flip-flop FF4, a fifth flip-flop FF5, and a fourth AND gate AND4, each of which is provided as a shared component for all channels.

The first detection unit 74_*i* is provided in order to detect a fault in the startup operation. Specifically, in a predetermined period $\tau_{DET}$ in which the generation of the driving current I$_{LEDi}$ is suspended, when the fault detection signal OPEN_DET$_1$ is asserted (set to high level), the first detection unit 74_*i* is configured to assert a first detection signal FF1_Q1.

The first detection unit 74_*i* includes a first flip-flop FF1_*i*. The first flip-flop FF1_*i* is configured to have a data terminal (D) supplied with the corresponding fault detection signal OPEN_DET$_i$, and to have a clock terminal supplied with the PULSE signal from the one-shot circuit 82. The PULSE signal is configured to have positive edge after the predetermined period of time $\tau_{DET}$ elapses after the START_OK signal is asserted. The first flip-flop FF1_*i* latches the fault detection signal OPEN_DET$_i$ using the positive edge.

The second detection unit 76_*i* is provided in order to detect a fault in the normal operating state after the completion of the soft start operation. Specifically, in the normal operating state, the second detection unit 76_*i* is configured to generate a second detection signal FF2_Qi which is asserted when a fault continues for a predetermined period T$_{CP}$.

The second detection unit 76_*i* includes a third detection unit 78_*i*, a second AND gate AND2_*i*, and a second flip-flop FF2_*i*.

In the normal operating state, the third detection unit 78_*i* is configured to generate a third detection signal FF3_Qi which transits to low level in a cyclic manner when no fault is detected, and which is fixed to high level and does not transit to low level when a fault is detected.

The third detection unit 78_*i* includes a second OR gate OR2_*i*, a first AND gate AND1_*i*, and a third flip-flop FF3_*i*. The second OR gate OR2_*i* is configured to generate the logical OR of the corresponding dimming pulse signal PWM$_1$ and the output signal FF3_Qi of the corresponding third flip-flop FF3_*i*. The first AND gate AND1_*i* is configured to generate the logical AND of the SS_END signal, the output signal OR2_*i* of the corresponding second OR gate OR2_*i*, and the corresponding fault detection signal OPEN_DET$_i$. The output of the first AND gate AND1_*i* is input to the reset terminal (logical inversion) of the corresponding third flip-flop FF3_*i*. The data terminal (D) of the third flip-flop FF3_*i* is fixed to high level. The system clock CLK is input to the clock terminal of the third flip-flop FF3_*i*.

In a situation in which the LED string 6_*i* is connected normally to the LED terminal LED$_i$, the relation V$_{LEDi}$>V$_{OPEN\_DET}$ holds true during the on-period T$_{ON}$ in which the dimming pulse signal PWM$_i$ is set to high level. Thus, the fault detection signal OPEN_DET$_i$ is negated (set to low level). As a result, the output of the first AND gate AND1_*i* is switched to low level. This resets the third flip-flop FF3_*i*, which switches the fault detection signal FF3_Qi to low level.

On the other hand, when an open fault or otherwise a ground fault occurs in the LED terminal LED$_i$, V$_{LEDi}$ becomes lower than V$_{OPEN\_DET}$ during the on-period T$_{ON}$ in which the dimming pulse signal PWM$_i$ is set to high level. In this state, the fault detection signal OPEN_DET$_i$ is asserted (set to high level). As a result, the output of the first AND gate AND1_*i* is not switched to low level. Thus, the third flip-flop FF3_*i* is not reset, and accordingly, the fault detection signal FF3_Qi, which is the output of the flip-flop FF3_*i*, remains at high level.

The counter 72 and the third OR gate OR3 form a timer circuit 73. The timer circuit 73 is configured to generate a count end signal (COUNT_END signal) which is asserted (set to high level) when the fault detection signal FF3_Qi of any of the channels remains at high level during the predetermined period $T_{CP}$. Furthermore, the timer circuit is configured to assert the COUNT_END signal when an LED_GND_DET signal described later remains asserted during the predetermined period $T_{CP}$.

The third OR gate OR3 is configured to generate a reset signal RST which is switched to low level in a cyclic manner when no fault is detected, and which is fixed to high level when a fault is detected. Specifically, the third OR gate OR3 is configured to generate the logical OR of the output signals FF3_Q1 through FF3_Qn of the third flip-flops FF3_1 through FF3_n of the respective channels and a ground fault detection signal (LED_GND_DET signal) which indicates whether or not a ground fault has occurred at any one of the LED terminals, and to input the logical OR thus generated to the reset terminal (logical inversion) of the counter 72 as the reset signal RST.

The counter 72 is configured to count up in synchronization with the clock CLK input to the clock terminal. In the normal state, the signal input to the reset terminal (logical inversion) of the counter 72 is switched to low level in a cyclic manner in synchronization with the pulse dimming signal $PWM_i$. Thus, the counter 72 is reset every cycle. On the other hand, when any kind of fault is detected, the reset terminal is not switched to low level. That is to say, during a period in which a fault remains, the counter 72 is not reset, i.e., the counter 72 counts up. When the count value reaches a predetermined value that corresponds to the time $T_{CP}$, the count end signal (COUNT_END signal) is asserted (set to high level).

The second AND gate AND2_i is configured to generate the logical AND of the COUNT_END signal and the output signal FF3_Qi of the corresponding third flip-flop FF3_i, and to input the logical AND thus generated to the clock terminal of the corresponding second flip-flop FF2_i. The data terminal (D) of the second flip-flop FF2_i is fixed to high level. When a fault remains during the predetermined period $T_{CP}$ in the normal operation, the second detection signal FF2_Qi, which is the output of the second flip-flop FF2_i, is asserted.

The first OR gate OR1_i is configured to generate the logical OR of the first detection signal FF1_Qi received from the corresponding first detection unit 74_i and the second detection signal FF2_Qi received from the corresponding second detection unit 76_i, so as to generate the LEDi_OFF signal which is asserted (set to high level) when the driving of the corresponding LED string 6_i is to be stopped. That is to say, when a fault is detected in the startup operation or otherwise in the normal operation, the LEDi_OFF signal is asserted. The LEDi_OFF signal thus generated is used to switch the corresponding pull-up circuit 90i between the active state and the inactive state.

The third AND gate AND3_i is configured to generate the logical AND of the corresponding LEDi_OFF signal, the corresponding fault detection signal OPEN_DET_i, and the FB_DET signal. The fourth OR gate OR4 is configured to generate the logical OR of the output signals of the third AND gates AND3_1 through AND3_n for all the channels. The fourth AND gate AND4 is configured to generate the LED_GND_DET signal configured as the logical AND of the SS_END signal and the output signal of the fourth OR gate OR4. That is to say, the LED_GND_DET signal is asserted when the fault detection signal OPEN_DET_i remains asserted after the pull-up circuit 90_i performs the pull-up operation.

The fourth flip-flop FF4 is configured to have a data terminal (D) supplied with the high level voltage, to have a clock terminal supplied with the COUNT_END signal, and to have a reset terminal (logical inversion) supplied with the LED_GND_DET signal.

The fifth flip-flop FF5 is configured to have a data terminal (D) supplied with a high level voltage, and to have a clock terminal supplied with the output signal FF4_Q of the fourth flip-flop FF4. The output of the fifth flip-flop FF5 is used as the ALL_LATCH signal.

Figure 8:
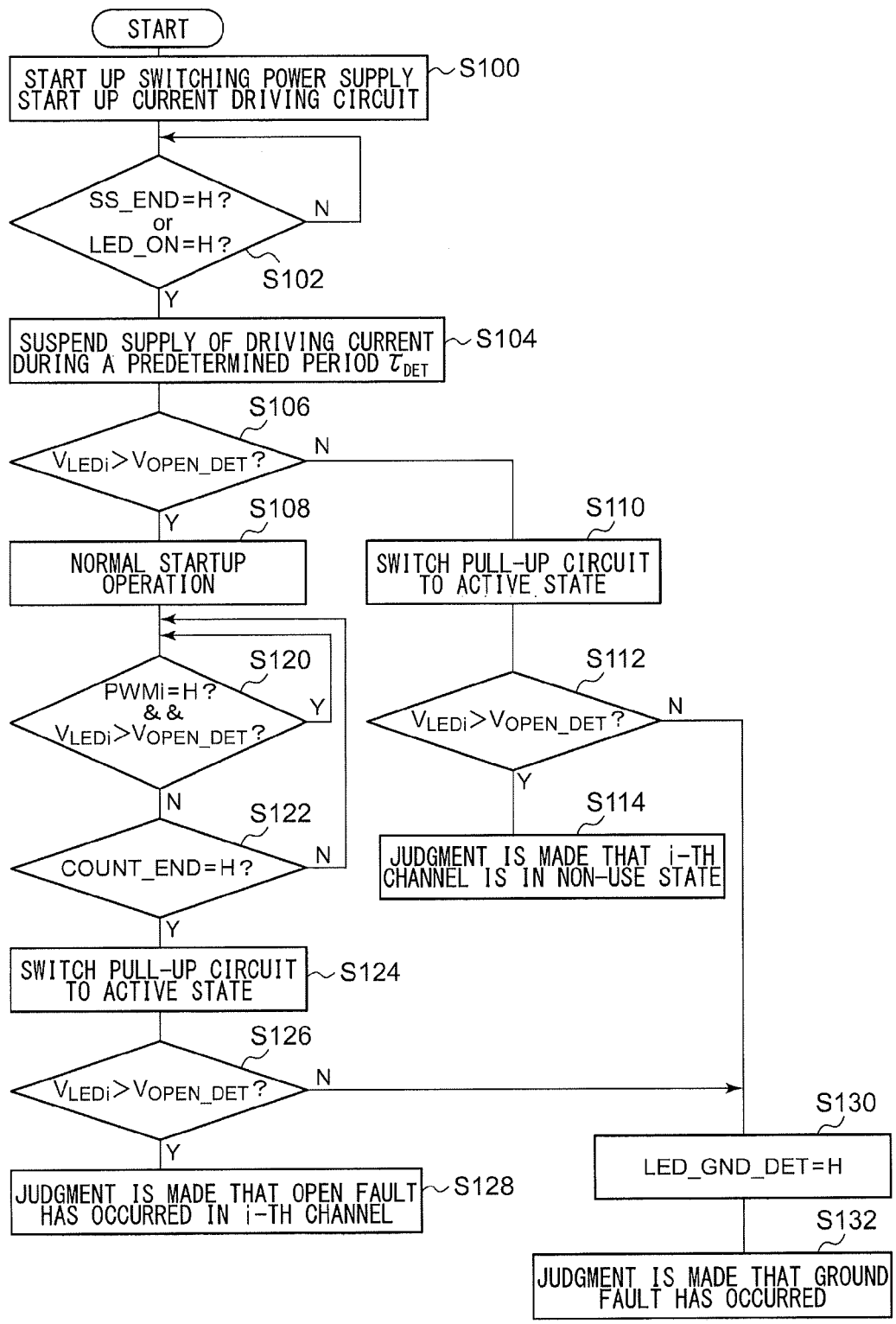
FIG. 8 is a flowchart showing the operation of the control IC shown in FIG. 6.

The above is the configuration of the fault detection circuit 70. Next, description will be made regarding the operation thereof. FIG. 8 is a flowchart showing the operation of the control IC 100a shown in FIG. 6.

When the standby signal STB input to the control IC 100a indicates an instruction to switch the state from the standby state to the operating state, the control IC 100a starts a startup sequence (S100). Subsequently, the control IC 100a stands by until the completion of the soft start operation or otherwise until the LED strings 6 are turned on (NO in S102). When the SS_END signal is asserted or when the LED_ON signal is asserted (YES in S102), the forced turn-off circuit 80 suspends the supply of the driving current $I_{LED}$ during the predetermined period $\tau_{DET}$ (S104). As a result, when $V_{LEDi} > V_{OPEN\_DET}$ (YES in S106), judgment is made that the LED string 6_i is connected normally to the LED terminal $LED_i$, and the startup operation is performed as usual (S108).

When $V_{LEDi} < V_{OPEN\_DET}$ (NO in S106), the output signal OPEN_DET_i of the fault detection comparator COMP_OPEN is asserted. In this state, the first detection unit 74i asserts the first detection signal FF1_Qi. That is to say, judgment is made that a fault has occurred in the startup operation. In this state, the LEDi_OFF signal, which is the output of the first OR gate OR1_i, is asserted, which sets the pull-up circuit 90_i to the active (on) state (S110).

When the pull-up circuit 90_i is set to the active state, the pull-up circuit 90_i supplies a current Ic to the LED terminal $LED_i$. In a case in which the LED string 6_i is not connected to the LED terminal $LED_i$, the LED terminal $LED_i$ is pulled up by the pull-up circuit 90_i, and $V_{LEDi}$ becomes greater than $V_{OPEN\_DET}$ (YES in S112). Thus, the fault detection signal OPEN_DET_i is negated (set to low level). When the fault detection signal OPEN_DET_i remains in the negated state, the output of the first AND gate AND1_i remains at low level, and the output FF3_Qi of the third flip-flop FF3_i remains at high level. In this state, the count operation by the counter 72 continues, and the COUNT_END signal is eventually asserted. In this state, the second detection signal FF2_Qi is asserted, and judgment is made that the i-th channel is in the non-use state (S114). In this case, with the i-th channel taken to be in the non-use state, the control IC 100a continues the driving operation for the other LED strings 6_i.

In a case in which the LED terminal $LED_i$ is short-circuited to the ground, the pull-up circuit 90 in the active state cannot pull up the LED terminal $LED_i$. As a result, $V_{LEDi}$ becomes lower than $V_{OPEN\_DET}$ (NO in S112), and the OPEN_DET_i signal is asserted.

In this state, the detection voltage $V_{LEDi}$ is in the vicinity of the ground voltage. Thus, the feedback voltage $V_{FB}$ rises to a value in the vicinity of the power supply voltage, and accordingly, the COMP_FB signal is asserted. Furthermore, the LEDi_OFF signal is asserted. Thus, the output signal of the third AND gate AND3_i is set to high level. Furthermore, the SS_END signal is asserted, and accordingly, the output signal of the fourth AND gate AND4, i.e., the LED_GND_DET signal, is asserted (set to high level) (S130). When the LED_GND_DET signal remains in the asserted state, the reset signal RST, which is the output of the third OR gate OR3, remains at high level. In this state, the count operation by the counter 72 continues, and the COUNT_END signal is eventually asserted. When the COUNT_END signal is asserted, the ALL_LATCH signal is asserted (S132). In a case in which a ground fault occurs even in only one channel, in some cases, this damages the circuit. Thus, when the ALL_LATCH signal is asserted, the control IC 100a stops the operations of the switching power supply 4 and the current driving circuit 8.

Returning to Step S108, when a fault is not detected in the predetermined period $\tau_{DET}$ immediately after the startup operation, the normal startup sequence is executed, thereby driving the LED strings 6_1 through 6_n (normal operating state). In the normal operating state, the detection voltage $V_{LEDi}$ is compared with the threshold voltage $V_{OPEN\_DET}$ in the on-period $T_{ON}$ in which the pulse dimming signal $PWM_i$ is asserted. When $V_{LEDi} > V_{OPEN\_DET}$ (YES in S120), judgment is made that the LED string 6_i is operating normally. In this case, the normal operating state is maintained.

When $V_{LEDi}$ becomes smaller than $V_{OPEN\_DET}$ in the on-period $T_{ON}$ (NO in S120), the output of the first AND gate AND1 remains at high level. In this state, the third flip-flop FF3_1 is not reset. Thus, the counter 72 is not reset. In this state, the count-up operation of the counter 72 continues (NO in S122). When such a fault remains for a predetermined number of cycles, the COUNT_END signal is asserted (YES in S122). In this state, the output signal FF2_Qi of the second flip-flop FF2_i is asserted, and accordingly, the LEDi_OFF signal is asserted. In this state, the pull-up circuit 90_i is switched to the active state (S124). When the relation $V_{LEDi} > V_{OPEN\_DET}$ is detected in the active state of the pull-up circuit 90_i (YES in S126), judgment is made that an open fault has occurred in the i-th channel (S128). In this case, the control IC 100a stops the driving operation for only the i-th channel, and continues the driving operation for the other channels.

Conversely, when $V_{LEDi} < V_{OPEN\_DET}$ (NO in S126) the fault detection signal $OPEN\_DET_i$ is asserted. In this state, the LED_GND_DET signal is asserted (S130), and judgment is made that a ground fault has occurred (S132). In this case, the driving operation is stopped for all the channels.

The above is the operation of the control IC 100a.

With the control IC 100a, immediately after the switching power supply 4 is started up, the predetermined period $\tau_{DET}$ is provided in which the supply of the driving current $I_{LED}$ is suspended. Furthermore, the detection voltage $V_{LED}$ is compared with the threshold voltage in the predetermined period $\tau_{DET}$. Thus, such an arrangement is capable of detecting a state in which the LED string 6_i has not been connected to the LED terminal $LED_i$ from the first when the switching power supply 4 is started up, and a state in which the LED terminal $LED_i$ has short-circuited to the ground.

Furthermore, by providing the pull-up circuit 90_i, immediately after the startup operation, and in the normal operating state, such an arrangement is capable of distinguishing between a state in which an open fault has occurred in the LED terminal $LED_i$ and a state in which a ground fault has occurred in the LED terminal $LED_i$.

Furthermore, such an arrangement is capable of open fault detection for each channel. Thus, when judgment is made that an open fault has occurred in a given channel, such an arrangement is capable of stopping the driving operation for this channel, and is capable of continuing the driving operation for the other channels.

Description has been made with reference to the embodiments regarding the present invention. The above-described embodiments have been described for exemplary purposes only, and are by no means intended to be interpreted restrictively. Rather, various modifications may be made by making various combinations of the aforementioned components or processes. Description will be made below regarding such modifications.

In a case in which the kind of the LED strings 6 is determined beforehand, the clamp circuit 40 may be switched between the active state and the inactive state according to the OVP voltage $V_{OVP}$.

Also, the clamp circuit 40 may be switched between the active state and the inactive state according to a voltage drop $V_{R21}$ that occurs at the current detection resistor R21.

By a combination of known digital circuits and analog circuits, other kinds of circuits may be configured to have the same function as that of the fault detection circuit 70 shown in FIG. 7, which can be designed by those skilled in this art. Such circuits having the same function are encompassed within the scope of the present invention.

Also, each MOSFET may be replaced by a bipolar transistor, which can be easily understood by those skilled in this art. Also, a modification may be made in which each N-channel (P-channel) transistor is appropriately replaced by a P-channel (N-channel) transistor, each NPN (PNP) transistor is appropriately replaced by a PNP (NPN) transistor, and the power supply voltage and the ground voltage are mutually exchanged, which is encompassed within the scope of the present invention.

Description has been made in the embodiments regarding a non-insulated switching power supply employing an inductor. Also, the present invention can be applied to an insulated switching power supply employing a transformer.

Description has been made regarding an electronic device as an application of the light-emitting apparatus 3. However, the usage of the present invention is not restricted in particular. Also, the present invention can be applied to an illumination device and so forth.

The settings of the logical signals, such as the high-level state and the low-level state of the logical signals, have been described in the present embodiments for exemplary purposes only. The settings can be freely modified by inverting the signals using inverters or the like.

While the preferred embodiments of the present invention have been described using specific terms, such description is for illustrative purposes only, and it is to be understood that changes and variations may be made without departing from the spirit or scope of the appended claims.

What is claimed is:

1. A control circuit configured to control a switching power supply for supplying a driving voltage to a first terminal of a light-emitting element, and to generate a driving current that flows through the light-emitting element, the control circuit comprising:
   a connection terminal to be connected to a second terminal of the light-emitting element;
   a current driving circuit connected to the connection terminal, and configured to generate an intermittent driving current that corresponds to a dimming pulse signal;
   an error amplifier configured to generate a feedback voltage that corresponds to a difference between a detection voltage that occurs at the connection terminal and a predetermined reference voltage;
   a pulse modulator configured to generate a pulse signal having a duty ratio that corresponds to the feedback voltage;
   a driver configured to drive a switching element of the switching power supply according to the pulse signal;

a fault detection comparator configured to generate a fault detection signal which is asserted when the detection voltage is lower than a predetermined threshold voltage;

a forced turn-off circuit configured to instruct the current driving circuit to suspend the generation of the driving current during a predetermined period after the switching power supply starts to operate; and a fault detection circuit configured to detect whether or not the fault detection signal is asserted in the predetermined period.

2. The control circuit according to claim 1, wherein the forced turn-off circuit is configured to instruct the current driving circuit to suspend the generation of the driving current during the predetermined period after the driving current that flows through the light-emitting element reaches a predetermined level.

3. The control circuit according to claim 1, wherein the forced turn-off circuit is configured to instruct the current driving circuit to suspend the generation of the driving current during the predetermined period after a soft start voltage, which rises with time, reaches a predetermined level.

4. The control circuit according to claim 1, further comprising a pull-up circuit configured to be switchable between an active state and an inactive state, and to supply a current to the connection terminal when it is set to the active state, wherein the fault detection circuit is further configured to set the pull-up circuit to the active state when the fault detection signal is asserted in the predetermined period, and to detect whether or not the fault detection signal is asserted after the pull-up circuit is set to the active state.

5. The control circuit according to claim 1, wherein the fault detection circuit is further configured such that, when the fault detection signal is not asserted in the predetermined period, the fault detection circuit detects whether or not the fault detection signal is asserted in a period in which the current driving circuit generates the driving current.

6. A light-emitting apparatus comprising:
a light-emitting element; and
a switching power supply configured to supply a driving voltage to one end of the light-emitting element,
wherein the switching power supply comprises:
an output circuit comprising a switching element; and
the control circuit according to claim 1, configured to drive the switching element.

7. An electronic device comprising:
a liquid crystal panel; and
the light-emitting apparatus according to claim 6, provided as a backlight of the liquid crystal panel.

8. A control circuit configured to control a switching power supply for supplying a driving voltage to a first terminal of a light-emitting element, and to generate a driving current that flows through the light-emitting element, the control circuit comprising:
a connection terminal to be connected to a second terminal of the light-emitting element;
a current driving circuit connected to the connection terminal, and configured to generate an intermittent driving current that corresponds to a dimming pulse signal;
an error amplifier configured to generate a feedback voltage that corresponds to a difference between a detection voltage that occurs at the connection terminal and a predetermined reference voltage;
a pulse modulator configured to generate a pulse signal having a duty ratio that corresponds to the feedback voltage;
a driver configured to drive a switching element of the switching power supply according to the pulse signal;

a fault detection comparator configured to generate a fault detection signal which is asserted when the detection voltage is lower than a predetermined threshold voltage;

a pull-up circuit configured to be switchable between an active state and an inactive state, and to supply a current to the connection terminal when it is set to the active state; and a fault detection circuit configured to set the pull-up circuit to the active state when the fault detection signal is asserted, and to detect whether or not the fault detection signal is asserted after the pull-up circuit is set to the active state.

9. The control circuit according to claim 8, further comprising a forced turn-off circuit configured to instruct the current driving circuit to suspend the generation of the driving current during a predetermined period after the switching power supply starts to operate, wherein the fault detection circuit is configured to set the pull-up circuit to the active state when the fault detection signal is asserted in the predetermined period, and to detect whether or not the fault detection signal is asserted after the pull-up circuit is set to the active state.

10. The control circuit according to claim 9, wherein the forced turn-off circuit is configured to instruct the current driving circuit to suspend the generation of the driving current during the predetermined period after the driving current that flows through the light-emitting element reaches a predetermined level.

11. The control circuit according to claim 9, wherein the forced turn-off circuit is configured to instruct the current driving circuit to suspend the generation of the driving current during the predetermined period after a soft start voltage, which rises with time, reaches a predetermined level.

12. The control circuit according to claim 8, wherein, when the fault detection signal is asserted in a period in which the current driving circuit generates the driving current, the fault detection circuit is configured to set the pull-up circuit to the active state, and wherein, after the pull-up circuit is set to the active state, the fault detection circuit is configured to detect whether or not the fault detection signal has been asserted.

13. A light-emitting apparatus comprising:
a light-emitting element; and
a switching power supply configured to supply a driving voltage to one end of the light- emitting element,
wherein the switching power supply comprises:
an output circuit comprising a switching element; and
the control circuit according to claim 8, configured to drive the switching element.

14. An electronic device comprising:
a liquid crystal panel; and
the light-emitting apparatus according to claim 13, provided as a backlight of the liquid crystal panel.

15. A control circuit configured to control a switching power supply for supplying a driving voltage to a first terminal of a light-emitting element, and to generate a driving current that flows through the light-emitting element, the control circuit comprising:
a current driving circuit connected to a second terminal of the light-emitting element, and configured to supply the light-emitting element with an intermittent driving current that corresponds to a dimming pulse signal;
a transconductance amplifier configured to generate a current that corresponds to a difference between a predetermined reference voltage and a detection voltage that occurs between the terminals of the current driving circuit;

a feedback terminal to be connected to a feedback capacitor;

a feedback switch arranged between the feedback terminal and an output terminal of the transconductance amplifier, and configured to turn on according to the dimming pulse signal;

a soft start circuit configured to generate a soft start voltage which changes with time;

a clamp circuit configured to be set to an active state so as to control a feedback voltage that develops at the feedback terminal such that it becomes equal to the soft start voltage regardless of the detection voltage level during a predetermined period after the switching power supply starts to operate;

a pulse modulator configured to generate a pulse signal having a duty ratio that corresponds to the feedback voltage; and a driver configured to drive a switching element of the switching power supply according to the pulse signal during a period in which the dimming pulse signal indicates a turn-on instruction, and to turn off the switching element during a period in which the dimming pulse signal indicates a turn-off instruction.

16. The control circuit according to claim 15, wherein the feedback switch is turned on during a period in which the clamp circuit is in an inactive state and the dimming pulse signal indicates a turn-on instruction.

17. The control circuit according to claim 15, wherein the clamp circuit comprises:

a first transistor having a first electrode connected to the feedback terminal; and a second transistor having a first electrode connected to a control electrode of the first transistor, and having a control electrode supplied with the soft start voltage, and configured as a transistor that is complementary to the first transistor.

18. The control circuit according to claim 17, wherein the clamp circuit further comprises an off circuit configured to fix a voltage at the control electrode of the first transistor to a level which turns off the first transistor during a period in which the clamp circuit is in the inactive state.

19. The control circuit according to claim 17, wherein the clamp circuit further comprises an impedance circuit arranged between the feedback terminal and a fixed voltage terminal, and configured to turn on during a period in which the clamp circuit is in the active state.

20. The control circuit according to claim 15, wherein the clamp circuit is set to the active state during a period until the driving current that flows through the light-emitting element reaches a predetermined level after the switching power supply starts up.

21. The control circuit according to claim 15, wherein the current driving circuit comprises:

a driving transistor and a current detection resistor arranged between the second terminal of the light-emitting element and a fixed voltage terminal; and an operational amplifier having an inverting input terminal connected to a connection node that connects the driving transistor and the current detection resistor, and having a non-inverting terminal to which a control voltage indicating the driving current is applied, and wherein the control circuit further comprises an on-state detection circuit configured to compare a voltage at the control electrode of the driving transistor with a predetermined voltage level in a period in which the dimming pulse signal indicates a turn-on instruction, so as to detect whether or not the driving current that flows through the light-emitting element reaches a predetermined level.

22. The control circuit according to claim 21, wherein the current driving circuit is arranged between the control electrode of the driving transistor and the fixed voltage terminal, and further comprises a dimming switch controlled to switch on and off according to the dimming pulse signal.

23. The control circuit according to claim 21, wherein the on-state detection circuit comprises:

a P-channel MOSFET having a source connected to a high voltage side power supply terminal of the operational amplifier, and having a gate connected to the control electrode of the driving transistor;

a current source arranged between a drain of the P-channel MOSFET and a low voltage side power supply terminal of the operational amplifier;

an N-channel MOSFET having a gate connected to the drain of the P-channel MOSFET, and having a source connected to the low voltage side power supply terminal; and a load arranged between a drain of the N-channel MOSFET and the high voltage side power supply terminal, wherein the on-state detection circuit is configured to output, as a signal which indicates a detection result, a signal that corresponds to a drain voltage of the N-channel MOSFET that develops in a period in which the dimming pulse signal indicates a turn-on instruction.

24. The control circuit according to claim 23, wherein the on-state detection circuit further comprises a flip-flop having a data terminal supplied with a drain voltage of the N-channel MOSFET, and having a clock terminal supplied with a signal that corresponds to a logical AND of the dimming pulse signal and a synchronization clock signal, and wherein the on-state detection circuit is configured to output an output signal of the flip-flop as a signal which indicates a detection result.

25. The control circuit according to claim 15, wherein the clamp circuit is configured to be set to the active state during a period in which a voltage that corresponds to the output voltage of the switching power supply is lower than a predetermined level after the switching power supply starts to operate.

26. The control circuit according to claim 15, wherein the clamp circuit is configured to be set to the active state during a period in which the output voltage of the switching power supply is lower than a level which allows the light-emitting element to emit light.

27. The control circuit according to claim 15, wherein the clamp circuit is configured to be set to the active state during a period in which the soft start voltage is lower than a predetermined threshold voltage.

28. The control circuit according to claim 15, wherein the pulse modulator comprises:

an oscillator configured to generate a cyclic voltage having a predetermined frequency and having a triangle waveform or a sawtooth waveform; and a pulse width modulation comparator configured to compare the feedback voltage with the cyclic voltage so as to generate a pulse signal.

29. A light-emitting apparatus comprising:

a light-emitting element; and a switching power supply configured to supply a driving voltage to one end of the light-emitting element, wherein the switching power supply comprises:
an output circuit comprising a switching element; and
the control circuit according to claim 15, configured to drive the switching element.

30. An electronic device comprising:
a liquid crystal panel; and
the light-emitting apparatus according to claim 29, provided as a backlight of the liquid crystal panel.

31. A driving circuit for a light-emitting element, comprising:
a current driving circuit connected to one end of a light-emitting element, and configured to supply the light-emitting element with an intermittent driving current that corresponds to a dimming pulse signal; and
an on-state detection circuit configured to detect whether or not the light-emitting element has become able to emit light,
and wherein the current driving circuit comprises:
a driving transistor and a current detection resistor arranged between the one end of the light-emitting element and a fixed voltage terminal; and
an operational amplifier having an inverting input terminal connected to a connection node that connects the driving transistor and the current detection resistor, and having a non- inverting input terminal to which a control voltage indicating the driving current is applied,
and wherein the on-state detection circuit is configured to compare a voltage at a control electrode of the driving transistor with a predetermined voltage level in a period in which the dimming pulse signal indicates a turn-on instruction, so as to detect whether or not the driving current that flows through the light-emitting element reaches a predetermined level,
and wherein the on-state detection circuit comprises:
a P-channel MOSFET having a source connected to a high voltage side power supply terminal of the operational amplifier, and having a gate connected to the control electrode of the driving transistor;
a current source arranged between a drain of the P-channel MOSFET and a low voltage side power supply terminal of the operational amplifier;
an N-channel MOSFET having a gate connected to the drain of the P-channel MOSFET, and having a source connected to the low voltage side power supply terminal; and
a load arranged between a drain of the N-channel MOSFET and the high voltage side power supply terminal,
wherein the on-state detection circuit is configured to output, as a signal which indicates a detection result, a signal that corresponds to a drain voltage of the N-channel MOSFET that develops in a period in which the dimming pulse signal indicates a turn-on instruction.

32. The control circuit according to claim 31, wherein the on-state detection circuit further comprises a flip-flop having a data terminal supplied with a drain voltage of the N-channel MOSFET, and having a clock terminal supplied with a signal that corresponds to a logical AND of the dimming pulse signal and a synchronization clock signal,
and the on-state detection circuit is configured to output an output signal of the flip-flop as a signal which indicates a detection result.

33. A light-emitting apparatus comprising:
a light-emitting element; and
the driving circuit according to claim 31, configured to drive the light-emitting element.

34. An electronic device comprising:
a liquid crystal panel; and
the light-emitting apparatus according to claim 33, provided as a backlight of the liquid crystal panel.

\* \* \* \* \*